(12) United States Patent
Lund

(10) Patent No.: US 7,540,570 B2
(45) Date of Patent: Jun. 2, 2009

(54) WHEEL SHOCK ABSORBING APPARATUS

(76) Inventor: Morten A. Lund, 400 N. Myers St., No. 41, Oceanside, CA (US) 92054

( * ) Notice: Subject to any disclaimer, the term of this patent is extended or adjusted under 35 U.S.C. 154(b) by 174 days.

(21) Appl. No.: 11/596,148

(22) PCT Filed: May 10, 2005

(86) PCT No.: PCT/US2005/016398

§ 371 (c)(1), (2), (4) Date: Nov. 9, 2006

(87) PCT Pub. No.: WO2005/110777

PCT Pub. Date: Nov. 24, 2005

(65) Prior Publication Data

US 2008/0036288 A1 Feb. 14, 2008

Related U.S. Application Data

(60) Provisional application No. 60/570,008, filed on May 10, 2004, provisional application No. 60/582,281, filed on Jun. 23, 2004, provisional application No. 60/631,119, filed on Nov. 24, 2004, provisional application No. 60/645,522, filed on Jan. 18, 2005.

(51) Int. Cl.
*B60B 27/00* (2006.01)
(52) U.S. Cl. .......................... 301/110.5; 152/40; 152/44
(58) Field of Classification Search ............ 301/110.5, 301/105.1, 5.1, 5.304, 5.7; 267/276; 152/17, 152/40, 44–51; 280/11.225, 124.166, 124.169
See application file for complete search history.

(56) References Cited

U.S. PATENT DOCUMENTS

| | | |
|---|---|---|
| 1,185,098 A | 1/1916 | Hopkins |
| 1,457,538 A | 6/1923 | Mark et al. |
| 3,072,169 A | 1/1963 | Hastings, Jr. |
| 4,294,491 A | 10/1981 | Black |
| 4,295,686 A | 10/1981 | Black |
| 4,403,784 A | 9/1983 | Gray |
| 4,602,822 A | 7/1986 | Kim et al. |
| 4,685,174 A | 8/1987 | Hager |
| 4,755,005 A | 7/1988 | Tsai |
| 5,305,496 A | 4/1994 | Gagnon et al. |

(Continued)

FOREIGN PATENT DOCUMENTS

FR 2676397 * 11/1992 ................. 152/17

*Primary Examiner*—Jason R Bellinger
(74) *Attorney, Agent, or Firm*—Mind Law Firm; Jeromye V. Sartain

(57) ABSTRACT

A wheel shock absorbing apparatus includes: a hub, one or more bearings seated within the hub, and an axle. At least two outer end caps, each with an axle mounting hole and an offset inwardly opening cavity, enclose the ends of the hub. A springing element is positioned within each cavity in the end caps, and an inner body unit is located between the outer end caps. An actuation stud projects from the inner body unit into the cavities to contact the springing element. Fastening elements secure the outer end caps together on opposite side of the inner body unit. A pivot stud allows the respective outer end caps and inner body unit to pivot with respect to one another, which causes the actuation stud to contact the spring element, which absorbs shocks as the wheel travels over a surface during locomotion of a vehicle.

20 Claims, 10 Drawing Sheets

U.S. PATENT DOCUMENTS

| | | |
|---|---|---|
| 5,393,078 A | 2/1995 | Bourdeau |
| 5,394,589 A | 3/1995 | Braeger et al. |
| 5,411,287 A | 5/1995 | Henschen |
| 5,493,755 A | 2/1996 | Kindstrand et al. |
| 5,573,309 A | 11/1996 | Bekessy |
| 5,704,621 A | 1/1998 | Lazarevich et al. |
| 5,823,543 A | 10/1998 | Burns |
| 6,019,435 A | 2/2000 | Bach |
| 6,322,153 B1 | 11/2001 | Lund |
| 6,406,101 B2 | 6/2002 | Lund |
| 6,702,399 B2 | 3/2004 | Lund |

* cited by examiner

WHEEL SHOCK ABSORBING APPARATUS

RELATED APPLICATIONS

This application claims priority and is entitled to the filing date of U.S. Provisional application Ser. No. 60/570,008 filed May 10, 2004, and entitled "Internal Suspension Hub with a C-Pocket Center Tube," U.S. Provisional application Ser. No. 60/582,281 filed Jun. 23, 2004, and entitled "Internal Suspension Hub with an Expanded C-Pocket Center Tube," U.S. Provisional application Ser. No. 60/631,119 filed Nov. 24, 2004, and entitled "Internal Shock Absorbing Hub," and U.S. Provisional application Ser. No. 60/645,522 filed Jan. 18, 2005, and entitled "internal Shock Absorbing Module." The contents of the aforementioned applications are incorporated herein by reference.

INCORPORATION BY REFERENCE

Applicant hereby incorporates herein by reference any and all U.S. patents and U.S. patent applications cited or referred to in this application.

TECHNICAL FIELD

Aspects of this invention relate generally to shock absorbing systems for vehicles, and more particularly to an apparatus configured to provide shock absorption for a wheel through controlled deflection of its hub or axle.

BACKGROUND ART

The following art defines the present state of this field:

U.S. Pat. No. 1,185,098 to Hopkins describes a vehicle wheel with a central hub box providing a pair of spaced thrust disks, a hub casing providing conical ends, annular members provided with inclined portions for wedgingly engaging within said conical casing ends, each annular member comprising a bearing flange for engaging the corresponding thrust disk and a cylindrical container, and cushioning members positioned in said cylindrical containers in engagement with said hub box.

U.S. Pat. No. 1,457,538 to Mark et al. describes a hub having pockets therein; a felloe; an annular ring reinforcing said felloe within said felloe; outwardly curved spring spokes, each mounted within one of the pockets of said hub, each spoke having an inwardly curved end resting upon the outwardly curved portion of the adjacent spoke; a thimble mounted within said felloe respective to each of said spokes; a raised seat upon said annular ring for each of said spokes; and a bolt for each of said spokes, said bolt passing through the spoke and its raised seat upon said annular ring and being threaded into one of said thimbles.

U.S. Pat. No. 3,072,169 to Hastings, Jr. describes a resilient wheel comprising an axle member, mounting means supported from said axle member having first and second annular axially spaced portions, an axle retainer member secured at one end of the axle member for supporting one of said mounting portions and maintaining a fixed axial spacing of said first and second portions, said axle and axle retainer members together comprising axle means, said mounting means being non-rotatable and each portion thereof including resilient shear rings, bearing means axially intermediate said first and second portions, and rim means mounted upon said bearing means for rotation radially outwardly of the mounting means.

U.S. Pat. No. 4,294,491 to Black describes a wheel construction having bearing means therein defining an axis of rotation. The bearing means is housed in an elastomeric sleeve having an elastic compressibility characteristic. A pair of identically shaped metallic stampings, each having a central cylindrical shell part axially aligned with the other, is provided for housing the bearing structure therein. Each of the stampings has a surface portion intermediate the central cylindrical shell part and the outer periphery thereof, which are coextensive with a central plane through the wheel construction perpendicular to the axis of rotation. The axially aligned cylindrical shell parts engage at least a portion of the elastomeric sleeve of the bearing structure. An annulus of moldable synthetic resin material is fixedly secured to the peripheral surface of the pair of metallic stampings to hold the cylindrical shell part and the surface portions in axial alignment. The annulus has an elastically flexible characteristic to thereby permit the pair of stampings to shift radially relative to one another while maintaining said surface portions in sliding engagement with one another.

U.S. Pat. No. 4,295,686 to Black describes a wheel construction including a rigid circular disk having a hole therethrough in the approximate center thereof. A bearing structure housed in a flexible sleeve is resiliently supported in the hole to facilitate a rotation of the disk about a defined axis of rotation. An annulus of moldable synthetic resin material is fixedly secured to the peripheral surface of the disk. The annulus has a rigid characteristic and the periphery thereof defines a tread mounting surface. An annular tread made of moldable synthetic resin material is fixedly secured to the tread mounting surface on the annulus. The tread has an outer diameter that is precisely concentric with the axis of rotation of the wheel. The materials of the tread and of the annulus are compatible with each other such that the tread becomes bonded to the annulus upon a molding thereof around the peripheral surface of the annulus. In one embodiment, the rigid circular disk is composed of a pair of identical metal stampings which are held together solely by the annulus.

U.S. Pat. No. 4,403,784 to Gray describes a roller skate formed of a plate with an upper surface to receive a shoe and having a forward and rearward downwardly extending suspension housing, each housing having an opening therethrough, an axle extending through each suspension housing opening having means at each end for receiving a skate wheel, a first and second elastomeric member received in each suspension housing in spaced apart relationship, each of the elastomeric members having an opening receiving the axle, bolts extending through threaded openings at the top of the suspension housing, the ends of the bolts engaging the upper surfaces of the elastomeric members so that the compressive force applied by the elastomeric members to the axle may be adjusted by threadably positioning the bolts. Another arrangement includes each axle in two portions hinged in the middle so that each roller skate wheel is independently resiliently supported relative to the skate body.

U.S. Pat. No. 4,602,822 to Kim et al. describes an apparatus for varying eccentrically or centrically the shaft of the bicycle wheel in order that the bicycle can run up and down like horseback riding beside regular level riding. The apparatus has an eccentric hub including a shaft housing formed integrally in eccentric position between two hub discs having an opening and a shaft penetrated through said shaft housing, two circular supporting plates coupled rigidly each other by three connecting rods to reserve revolvably said eccentric hub therebetween, each which has a hub disc housing formed in its eccentric position said hub disc housing has a relatively large hole on its centric portion to exposure the shaft and also a plurality of openings corresponding to different eccentric positions on its circumference of circle, and a resettable spring loaded rod for locking the eccentric hub between the hub disc housings of the circular supporting plates by passing through the openings in alignment with each other.

U.S. Pat. No. 4,685,174 to Hager describes a shock absorbing caster wheel in which the wheel support bracket is pivotally mounted on a caster bracket and a spring engages the wheel support bracket and caster bracket to absorb shocks on the caster wheel. Vibration dampening pads on the caster bracket slidably engage wall surfaces on the wheel support bracket to dampen oscillation of the wheel support bracket.

U.S. Pat. No. 4,755,005 to Tsai describes a hub of a bike or multiple-wheel cycle formed with an eccentric wheel or axle in the hub and the eccentric axle having a chain sprocket thereon rotatably mounted with a spindle fixed on a frame fork so that upon the rotation of the axle, the hub and any rear or front wheel secured on the hub will be rotated eccentrically to cause a cam-like action to mimic a horse-riding so as to spur the player or rider interest.

U.S. Pat. No. 5,305,496 to Gagnon et al. describes a caster having two spaced apart wheels with an elastomeric torsional shock and vibration isolating suspension between them. The wheel axis is spaced longitudinally from a bearing axis to subject elastomeric disks positioned between the wheels to torsional shear stresses to help absorb shocks and vibrations. A snubber is provided for limiting the angular motion of the wheels about a bearing axis.

U.S. Pat. No. 5,393,078 to Bourdeau describes a skate including a chassis formed by an upper horizontal plate solidly joined to the sole of a shoe by fasteners and a lower part running perpendicular to the plate and including at least one lateral flange on which the wheels are disposed by transverse axles solidly joined to the chassis, constituting a rolling train, each of the wheels having a hub in fixed rotation, which is disposed on the axle and which supports a bearing interpolated between the hub and a tire. The hub of the wheel is equipped with an arrangement which allows for its angular deflection relative to its median horizontal plane. The arrangement for angular deflection includes the transverse axle which is horizontally off-center in relation to the virtual center of the wheel which can cooperate by abutment with a fixed axle solidly joined to the chassis which passes through it, and which supports an elastic recoil device.

U.S. Pat. No. 5,394,589 to Braeger et al. describes three embodiments of a shock-isolating caster. A surface-effect damper engages at least one of a wheel element and an intermediate structural member to dampen vibration and shock loads which would otherwise be transmitted from the wheel element through the intermediate structure and mounting member to the equipment supporting cart. A first embodiment positions the damper between an outer wheel rim and an inner wheel hub. Second and third embodiments mount the wheel on a pivotable arm and dampen the movement of the arm. Capability to adjust damping levels is provided.

U.S. Pat. No. 5,411,287 to Henschen describes a torsion axle for a vehicle including an elongated axle tube enclosing first stage torsion shafts and second stage torsion shafts all having a common axis, and a metal tube or a non-circular portion of the axle tube and a plurality of resilient rubber rods confining each of the shafts for torsionally resisting rotation of the shaft. Each first stage metal tube is secured to the surrounding axle tube, and each second stage metal tube is connected to the corresponding first stage shaft. A stud projects outwardly from each second stage metal tube through a slot within the surrounding axle tube to limit rotation of the second stage tube with the first stage shaft, and a crank arm and eccentric spindle are secured to the outer end portion of each second stage shaft for receiving a wheel. In modifications, the first stage shafts for both the left and right wheels are connected as one shaft, and a hydraulic winch cable and spool provide for pre-rotating the one shaft or the axle tube to lower and raise the vehicle.

U.S. Pat. No. 5,493,755 to Kindstrand et al. describes a caster having a stationary hub with a bearing between the hub and a floor engaging wheel ring which allows the wheel ring to rotate relative to the hub. Torsional elastomeric elements mount the hub between spaced support arms radially inward of the bearing and are positioned eccentrically relative to the axis of rotation of the wheel ring so as to suspend the hub resiliently between the arms. In an alternate embodiment, the hub is cantilevered from a single support arm.

U.S. Pat. No. 5,573,309 to Bekessy describes an in-line roller skate wheel and truck in which an elongated truck frame with a pair of spaced longitudinal side rails mount a plurality of roller wheels. At least one of the roller wheels has a hub core with a coaxial tire receiving shoulder. A tapered tire deflection controlling rim extends circumferentially about the shoulder, with rim side walls extending radially outward from a wide base at the tire receiving shoulder to a narrow peripheral surface. An annular resilient tire is mounted to the hub, engaging the tire receiving shoulder and encasing the tapered tire deflection controlling rim. The tire includes an annular ground engaging surface section and an annular high friction shoulder situated radially inward and axially outward of the ground engaging outer surface. The rim and tire configuration aid in maximizing speed and control in turns. Another one of the in-line roller wheels, situated at the heel end of the truck includes a tire of a slightly reduced diameter and is formed of a resilient material with a hardness value greater than the remaining tires on the truck. It also includes recessed braking dimples on its ground engaging surface to aid in approximating heels-forward "skid" stopping in a manner similar to stopping methods used by ice skaters.

U.S. Pat. No. 5,704,621 to Lazarevich et al. describes a suspension system for an in-line roller skate in which the suspension system independently controls each wheel of the skate. The suspension system components for each wheel include a swing arm that is pivotally mounted to a frame attached to a boot of the skate. The wheel is rotatably mounted on a rotation axle between opposing legs of the swing arm. Two C-shaped spring stays are secured to opposing side rails of the frame where one leg of each spring stay travels through a stand-off rigidly secured to one of the opposing legs of the swing arm. A helical spring surrounds the leg of each spring stay between the stand-off and the frame. When the wheel encounters a bump in the ground terrain, the swing arm pivots up and the helical springs are compressed between the stand-off and the frame providing shock absorption. A rebound stop prevents the swing arm from pivoting too far downward. A jounce stop prevents the swing arm from pivoting too far upward.

U.S. Pat. No. 5,823,543 to Burns describes a roller skate shock absorber system in at least two double pivot mechanisms spaced longitudinally from front to back along a skate shoe; a truck device including a plurality of wheels interconnected with the double pivot mechanisms; each of the double pivot mechanisms including a first pivot mounted to the skate shoe, a pivot member rotatably connected to the first pivot and having a second pivot rotatably attached to the truck device; and at least one resilient member disposed between the skate shoe and the truck mechanism for biasing at least one of the pivot mechanisms with its first and second pivots generally vertically aligned to provide a firm push-off force.

U.S. Pat. No. 6,019,435 to Bach describes a wheel hub with suspension including a carrier arm, a swivel axle and a hub body rotatably secured to the swivel axle. A resilient element is positioned between the carrier arm and the swivel axle. A load on the wheel or the hub body will cause the swivel axle to be displaced relative to the carrier arm, whereby the resilient element is deformed and exercises its resilient effect. The wheel hub may be used in many different applications and for many different types of wheels, such as wheels on vehicles, driving wheels, and support wheels.

U.S. Pat. No. 6,322,153 to Lund describes an outer wheel, tire and rim that is mounted onto an inner wheel or hub and is adapted for low friction rotation on the hub. An arm is pivotally attached to the inner wheel and carries a receiver for the axle upon which the wheel is mounted so that the axle is positionable over an arc of rotation about the pivot point of the arm. The arm is biased by an elastomeric body so that as the arm moves over its arc of rotation, the elastomeric body is compressed. As the wheel rotates under load, road shocks are transferred to the biasing device which acts as a shock absorber.

U.S. Pat. Nos. 6,406,101 and 6,702,399 to Lund describe a shock absorbing bicycle wheel hub apparatus that uses an open ended, cylindrical shock absorber housing mounted concentrically within a wheel hub. The wheel hub is adapted for rotation about the shock absorber housing. A pivot rod or tube is axially aligned with the shock absorber housing and rotationally mounted within its sidewall. Terminal ends of the pivot rod or tube engage cover plates fixedly mounted thereon. A pressure tube is axially aligned with the shock absorber housing and extends through it so that its terminal ends may be fixed in the cover plates. A shock-absorbing medium is compressively positioned between the pressure tube and an interior surface of the shock absorber housing. The cover plates engage a bicycle fork so that weight supported by the bicycle fork is transmitted through the cover plates and the pivot rod or tube and the pressure tube, to the shock absorbing medium, and thereby, through the shock absorber housing and the wheel hub to a wheel of the bicycle. Likewise, road shocks are transmitted through the shock-absorbing medium in the same way.

French Patent No. FR2676397 to Berges describes an integrated suspension wheel and shock absorber formed from a rigid rim which supports a tire. Four rings of cylindrical form join the rim to the hub. Paddle blades located radially between the suspension rings increase transmission of the torque. The rings serve progressively as shock absorbers. They are made of composite synthetic material having an elasticity calculated as a function of the required suspension. The material which fixes the rings to the rim and to the hub is a mono- or multi-component polyurethane.

The prior art described above teaches various wheel suspension hubs and devices, but does not teach a wheel shock absorbing apparatus providing further advantages in shock absorption and travel by improving the geometry and mechanical interaction of the components and effectively moving the suspension elements out of the wheel hub itself. Aspects of the present invention fulfill these needs and provide further related advantages as described in the following disclosure.

DISCLOSURE OF INVENTION

Aspects of the present invention teach certain benefits in construction and use which give rise to the exemplary advantages described below.

The wheel shock absorbing apparatus of the present invention includes a hub, a wheel installed on the hub, one or more bearings seated within the hub, and an axle running therethrough as is known in the art to together generally form a wheel assembly useful for achieving locomotion of a vehicle. The improvement to this construction generally comprises: at least two outer end caps, each having an axle mounting hole and an inwardly-opening cavity offset from the axle mounting hole; at least one springing element positioned within each cavity; an inner body unit positioned substantially between the outer end caps and comprising at least one actuation stud oriented so as to project into the cavities and selectively contact the at least one springing element; a means for pivoting the outer end caps relative to the inner body unit; and a means for fastening the outer end caps together about the inner body unit such that the at least one springing element is trapped within the respective cavity. The axle about which the hub and wheel rotates is installed in the axle mounting hole of the apparatus, and the pivot stud is then operative between the respective outer end caps and the inner body unit so that the outer end caps and the inner body unit pivot with respect to one another to cause the actuation stud to contact the at least one springing element so as to absorb shocks as the wheel travels over a surface during locomotion of the vehicle.

An aspect of the present invention may then be generally described as an improved wheel suspension system where the major suspension parts are arranged in such a manner that the axle moves within the hub of the wheel. One advantage is an improved ratio of travel resulting from moving the springing element from under the axle as in many prior art devices to a cavity or space in the outer end cap. Other advantages of this development are lighter weight, compact design, and a geometry which gives a better motion of the wheel relative to the vehicle. In particular, this suspension system provides an efficient and lightweight means of absorbing vibration and minor irregularities in the travel surface.

A further aspect of the present invention may be generally described as an improved wheel suspension system where the major suspension parts are arranged in such a manner that the axle moves in an arc around a shaft with a rigidly attached paddle. A springing element is seated in a cavity formed within a module defined by respective outer end caps in such a manner that the paddle acts progressively on the springing element as the axle moves through an arc. The shaft with paddle passes through the module and is rigidly attached to the frame of the vehicle. The dimensions and placement of the paddle control and restrain the lateral position of the module relative to the vehicle. Among the advantages to this development are light weight, compact sealed design, spring adjustability, and low cost of manufacturing. The suspension system may be applied to any implement or vehicle that requires suspension. In particular, this suspension system provides an efficient and light-weight means of absorbing vibration and minor irregularities in the travel surface.

A still further aspect of the present invention may be generally described as a center tube on which a wheel hub is mounted having a C-pocket through hole cooperative with a tubular springing element positioned about the axle to provide a desired amount of damping, or drag, against the sides of the C-pocket through hole as the axle moves in an arc relative to a pivot stud. The amount of such damping may be varied at will by selection of elastomer parts of differing size and shape and density. The shape and dimensions of the C-pocket determine the amount of compression and deformation exerted on the axle, and any enclosed elastomers, by the movement of the axle, and the length and thickness of the elastomer ring fitted to the axle determines the amount of damping applied to the movement of the axle; that is, a "shock-absorber" type of reaction is achieved through this aspect of the present invention whereby the speed of the return movement of the axle is controlled and limited for the sake of comfort and vehicle control.

Other features and advantages of aspects of the present invention will become apparent from the following more detailed description, taken in conjunction with the accompanying drawings, which illustrate, by way of example, the principles of aspects of the invention.

BRIEF DESCRIPTION OF DRAWINGS

The accompanying drawings illustrate aspects of the present invention. In such drawings.

MODES FOR CARRYING OUT THE INVENTION

The above described drawing figures illustrate aspects of the invention in at least one of its exemplary embodiments, which are further defined in detail in the following modes.

Figure 1:
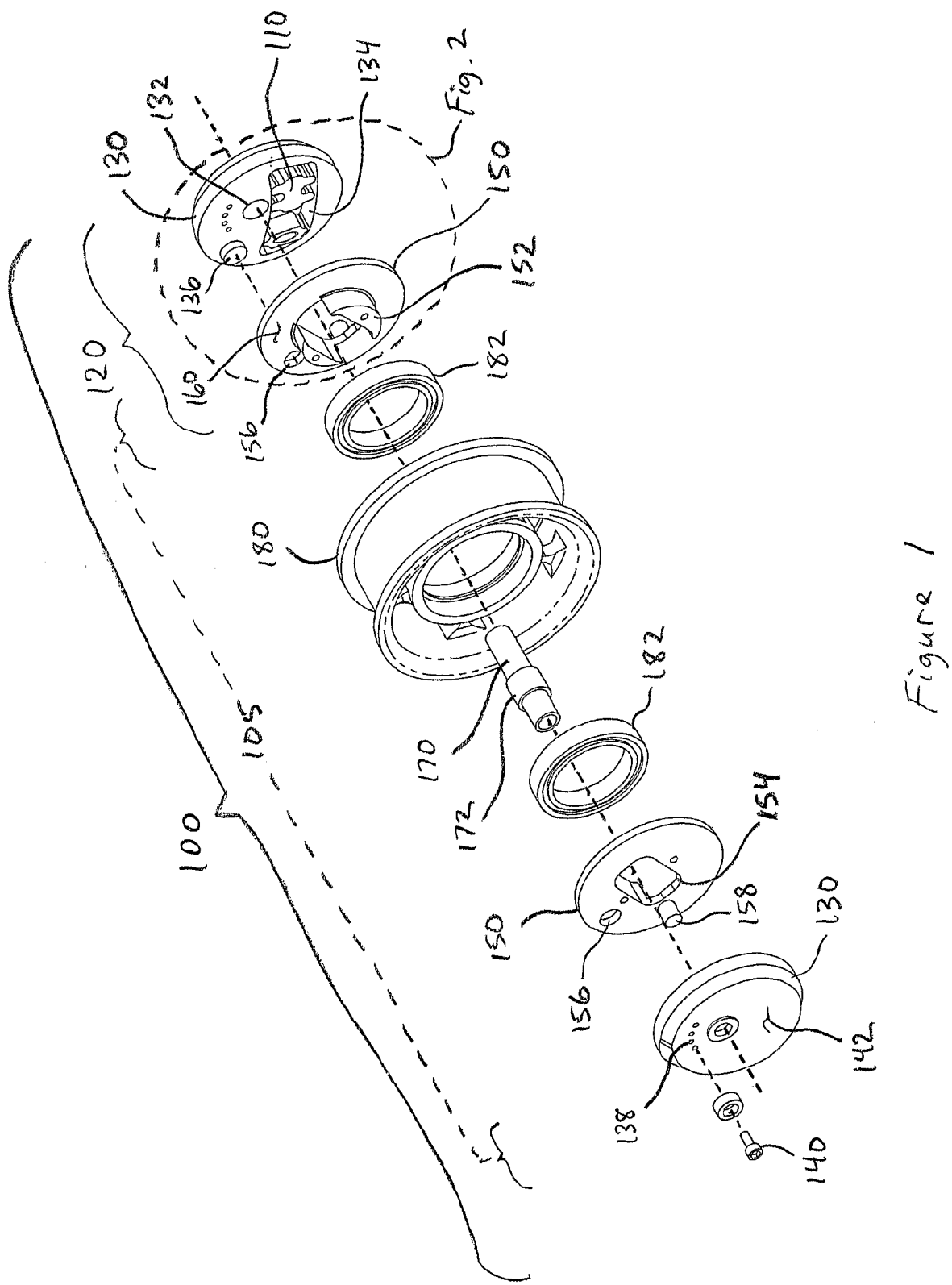
FIG. 1 is an exploded view of an exemplary embodiment of the invention.
Figure 2:
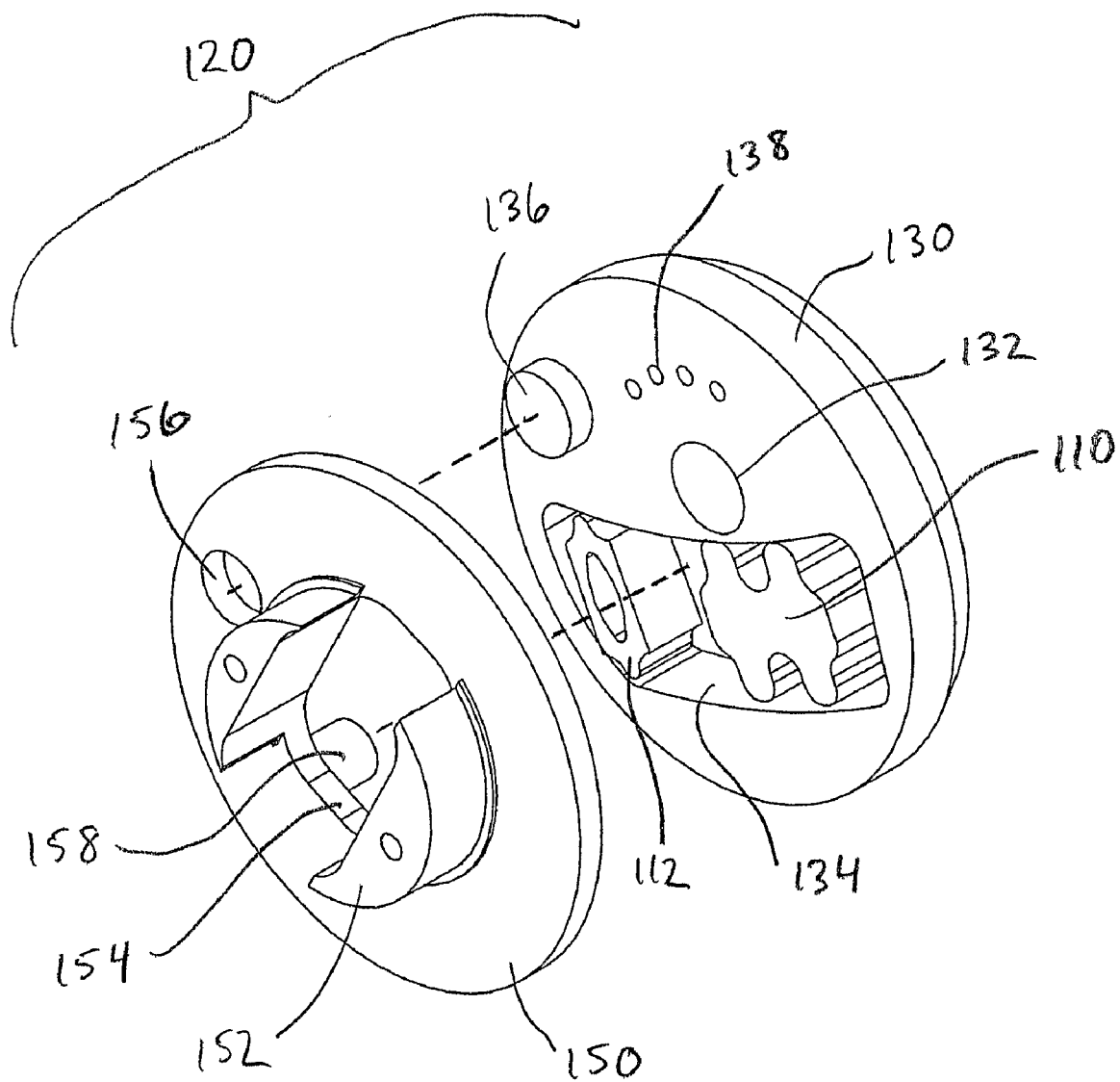
FIG. 2 is an enlarged in scale partial view of the embodiment of the invention shown in FIG. 1 taken from circle "FIG. 2"

A first exemplary embodiment of the wheel shock absorbing apparatus of the present invention as shown in FIGS. 1 and 2 is an assembly 100 made up in part of a springing element 110, normally a coiled spring or an elastomer, seated within a divided end cap 120 in such a manner that the springing action occurs when the parts of the divided end cap pivot relative to one another, one side of the pivot effectively acting against the axle 170, and the other side of the pivot effectively acting against the hub 180, with the seated springing element 110 limiting the pivot action in such manner as to control the velocity and extent of the travel allowed to the axle 170 through its arc of motion relative to the hub as delimited by its effective pivot about the pivot stud 136 of the outer end cap 130, more about which is said below. It will be appreciated by those skilled in the art that by placing the springing element in the end cap 120 rather than within the space defined by the inside diameter of the hub, a larger pivot radius and, hence, greater travel of the wheel with respect to the vehicle's frame is achieved. As such, it will be further appreciated that the increased performance and other advantages of this construction can be achieved in numerous other ways beyond those exemplary embodiments shown and described, which are for illustration only. A wide array of geometries and materials are possible without departing from the spirit and scope of the invention.

With reference now to FIG. 1, in more detail, the wheel shock absorbing assembly 100 is made up of the following major parts, depending on the particular embodiment: namely, the hub 180, the axle 170, a negative tubular springing element 172 fitted to the axle where it passes through the hub, two bearings 182, two inner end caps 150, two outer end caps 130, a springing element 110 seated within each outer end cap, and two attachment devices which establish a fixed relationship between each end of the axle and the frame of the vehicle (not shown). Additional minor parts may include pins, screws, clips, bushings, and other small parts as necessary to hold the major parts in proper working relationship to each other. In the first exemplary embodiment of FIG. 1, the inner end cap 150 is provided with protrusions, or a boss 152, which fits inside the inner ring of the bearing 182, a channel, or clearance hole 154 of virtually any configuration through which the axle may move freely through its effective pivot arc relative to the hub 180, a pivot stud hole 156 to receive the pivot pin, or pivot stud 136, of the outer end cap, and a pin, or actuation stud 158, to act against the springing element 110 in the outer end cap 130. As shown more clearly in FIG. 2, the outer end cap 130 is provided with an inwardly-protruding pivot stud 136 to fit into the pivot stud hole 156 in the inner end cap 150. The outer end cap 130 is further provided with an axle mounting hole 132 for the axle 170 to pass through, a slot, or cavity 134, of particular shape and dimension to receive the springing element 110, and a multiplicity of threaded trajectory holes 138 that hold the trajectory screws 140 which control the angle at which the assembly is related to the frame of the vehicle (not shown). In a preferred embodiment, the springing element 110 is an elastomer shaped to fit within the cavity 134 of the outer end cap 130 to receive the pivot force from the actuation stud 158 protruding from the inner end cap 150. Other embodiments may provide for a coiled spring or other types of springing elements, including, for example, a solid elastomer block, a hollow elastomer block, an elastomer block with voids, a solid elastomer disc, a hollow elastomer disc, an elastomer disc with voids, a solid elastomer cylinder, a hollow elastomer cylinder, an elastomer cylinder with voids, a solid elastomer wedge, a hollow elastomer wedge, and an elastomer wedge with voids. It will be appreciated that any combination of such springing elements, both in configuration and in number, may be employed in the present invention. Accordingly, and as shown in the other exemplary embodiments of the present invention discussed below, the cavity 134 housing the springing elements 110, 112 may also take on a variety of configurations without departing from the spirit and scope of the present invention. The bearing 182 is a standard commercial item, sized to fit into the hub 180 and over the bosses 152 protruding from the inner surface 160 of the inner end cap 150 and with a large enough inside dimension to allow free movement of the axle 170 through its range of travel as provided by the pivot assembly. In a preferred embodiment, the axle 170 is a hollow tube of high strength material of the smallest diameter consonant with the required degree of strength and is provided with internal threads at each end to receive a bolt (not shown) which holds the axle in a fixed relationship to the frame of the vehicle (not shown), though it will be appreciated that axles of a variety of sizes and materials can be employed as best suiting a particular application. In most embodiments, the attachment point of the vehicle frame will be in the form of a slotted fork fitting the bolt attached to the axle 170 and the trajectory screws 140 which are fitted into the outer side 142 of the outer end cap 130. In a preferred embodiment, the negative springing element 172 is a tube of elastomer material which is fitted over the axle 170 where it passes through the hub 180 and which limits and controls the motion of the axle as it returns from its extended position under force against the encapsulated springing element 110. Further, a negative springing element 112 may also be provided within the cavity 134 of the outer end cap 130 opposite the main springing element 110 to, again, limit and control the motion of the axle 170 as it returns from its extended position.

An aspect of the present invention may be more generally described as an improved wheel suspension system where the major suspension parts are arranged in such a manner that the axle moves within the hub of the wheel. One advantage is an improved ratio of travel resulting from moving the springing element 110 from under the axle 170 as in many prior art devices to the space in the outer end cap 130; namely, the cavity 134. Other advantages of this development are lighter weight, compact design, and a geometry which gives a better motion of the wheel relative to the vehicle. In particular, this suspension system provides an efficient and lightweight means of absorbing vibration and minor irregularities in the travel surface.

The assembly 100 provides for the axle 170 to effectively move through an arc within the hub 180 relative to a pivot point, essentially, the central axis of the pivot stud 136, the extent of the movement being dependent on the weight applied to the vehicle's frame and on the effect of irregularities in the travel surface as they act on the wheel. The axle 170 is attached rigidly to the frame of the implement or vehicle and flexibly to the hub of the wheel through a suspension system consisting of the parts named herein. Two divided end caps 120, one at each end of the axle 170, provide for suspension motion and the springing action of the assembly. The outer end cap 130 of each divided end cap 120 holds the axle 170 in the respective axle mounting holes 132, the negative spring 112 and the main spring elements 110. The inner end cap 150 of each divided end cap 120 holds a bearing 182 which supports the hub 180 and provides a clearance hole 154 of sufficient size and shape to allow the axle 170 to freely move through its effective arced path relative to the hub during use of the wheel shock absorbing apparatus 100 of the present invention. The inner end caps 150 may be fastened together at their respective bosses 152 using any method now known or later developed in the art, such as screws, bolts, welding, adhesives, snap or interference fits, and the like, or the inner end caps may simply be held in position adjacent to one another through the rest of the assembly, namely, the press fit of the inner end cap bosses 152 within the bearings 182, which are in turn seated within the hub 180, and the pivotable attachment of the inner end caps 150 to their respective outer end caps 130 on the pivot stud 136, the outer end caps being held together by the axle 170. Collectively, in the exemplary embodiment of FIGS. 1 and 2, the pair of inner end caps 150 so assembled, including the respective actuation pins 158 explained further below, together define an inner body unit 105 of the assembly 100. The outer and inner end caps 130, 150 of each divided end cap 120 pivot relative to each other about the pivot stud 136 extending from the outer end cap 130 into a pivot stud hole 156 in the inner end cap 150 and so control the relative motion of the axle 170 and the hub 180. The suspension springing force is provided by an actuation stud 158 protruding from the inner end cap 150 of the divided end cap 120 into the cavity 134 so as to act against a springing element 110 seated within the outer end cap 130 of the divided end cap. It will be appreciated that the assembly as described above wherein the respective outer and inner end caps 130, 150 are brought into substantial parallel and abutting relationship, the springing elements 110 are so contained within the cavity 134 and are unable to shift to any real extent laterally, or along the axis of the assembly 100. In the first exemplary embodiment, bosses 152 integral to and protruding from the inner side 160 of the inner end cap 150 fit tightly to the inside dimension of the bearing 182 and serve to support the hub 180 through the rotational motion provided by the bearings. The angle at which the assembly moves relative to the vehicle, and thereby the geometry of the suspension action, can be altered by positioning the trajectory screw 140 in the threaded holes 138 of the outer end cap 130. The negative springing elements 112 provide for a controlled return of the axle 170.

In operation, the hub 180 and inner parts of the divided end caps 120 move in response to weight applied to the vehicle or implement and to irregularities in the surface over which the wheel travels. Such movement is translated through the pivot action of the inner and outer end caps 130, 150 with respect to one another about the pivot stud 136, as explained above, into travel of the axle 170 through an arc within the hub defined by the geometry of the pivot points and the axle holding points, or the location of the pivot stud 136 relative to the axle mounting hole 132, which define the effective radius of the arced path through which the axle moves during use. As the outer end cap 130 of the divided end cap 120 pivots relative to the inner end cap 150, the actuation stud 158 protruding from the inner end cap 150 compresses the springing element 110 seated within the inwardly-opening cavity 134 of the outer end cap 130. Again, in a preferred embodiment, this springing element 110 is an elastomer shaped and sized to fit within the cavity 134 in the outer end cap 130 of the divided end cap 120. The extent and speed of the movement are controlled and limited by the resilient force applied by the springing elements 110 against the pin 158. The length, thickness and hardness of the springing elements 110 and the ratio of the cavity 134 of the outer end cap determine the amount of damping applied to the movement of the axle 170. Regarding the actuation stud 158 itself, though it is shown and described as a pin extending from the inner end cap 150, it will be appreciated by those skilled in the art that any such protrusion now known or later developed in the art, including, for example, a screw or bolt, a machined, press-fit, welded, adhered, or otherwise attached post, or any other such device can be employed in the present invention to achieve mechanical engagement between the inner end cap 150 and the springing elements 110 of the outer end cap 130. Once more, it will be appreciated as well that a variety of modifications to the structure shown and described in the first exemplary embodiment of FIGS. 1 and 2 is possible without departing from the spirit and scope of the present invention.

Figure 3:
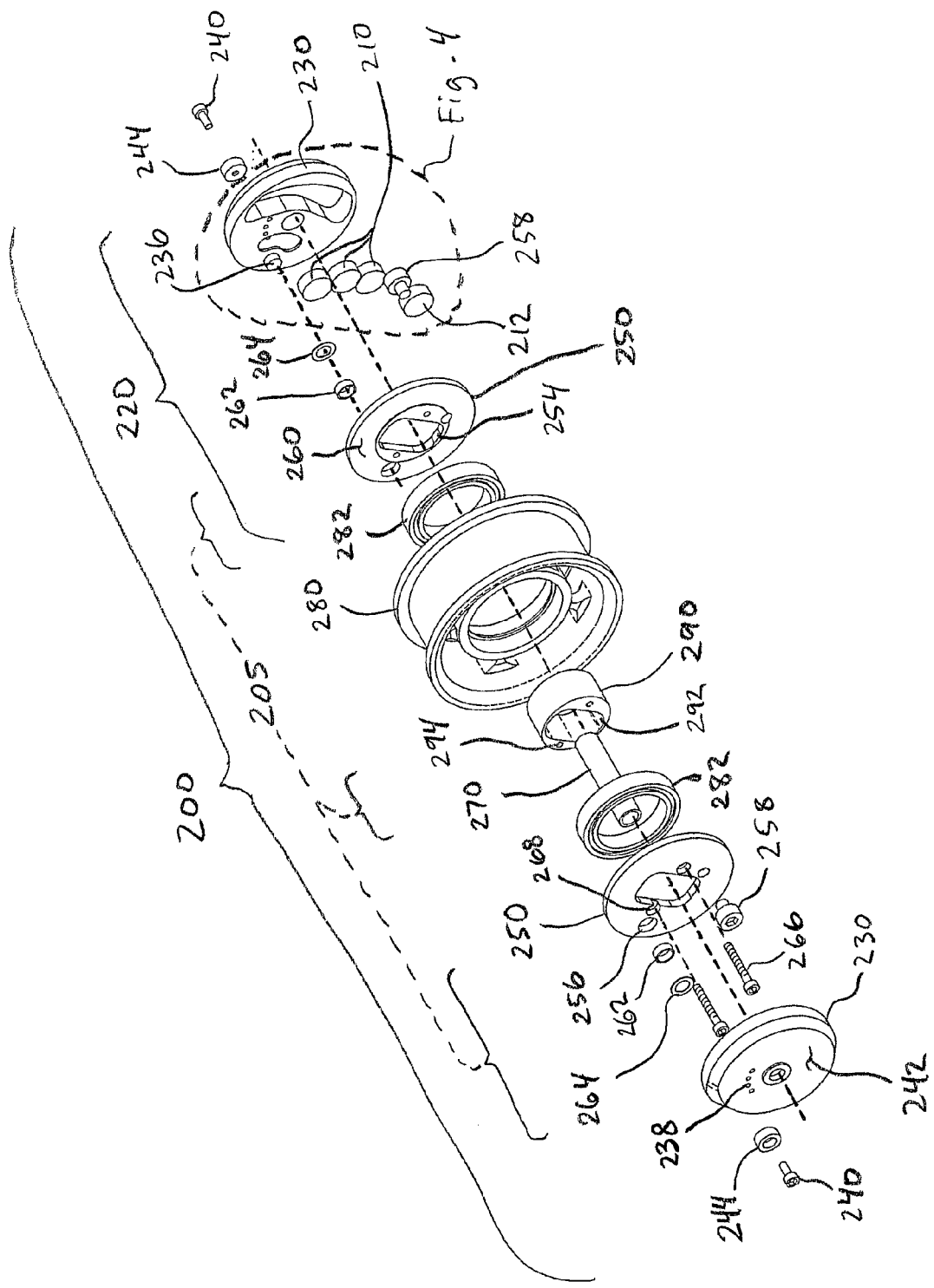
FIG. 3 is an exploded view of an alternative exemplary embodiment of the invention.
Figure 4:
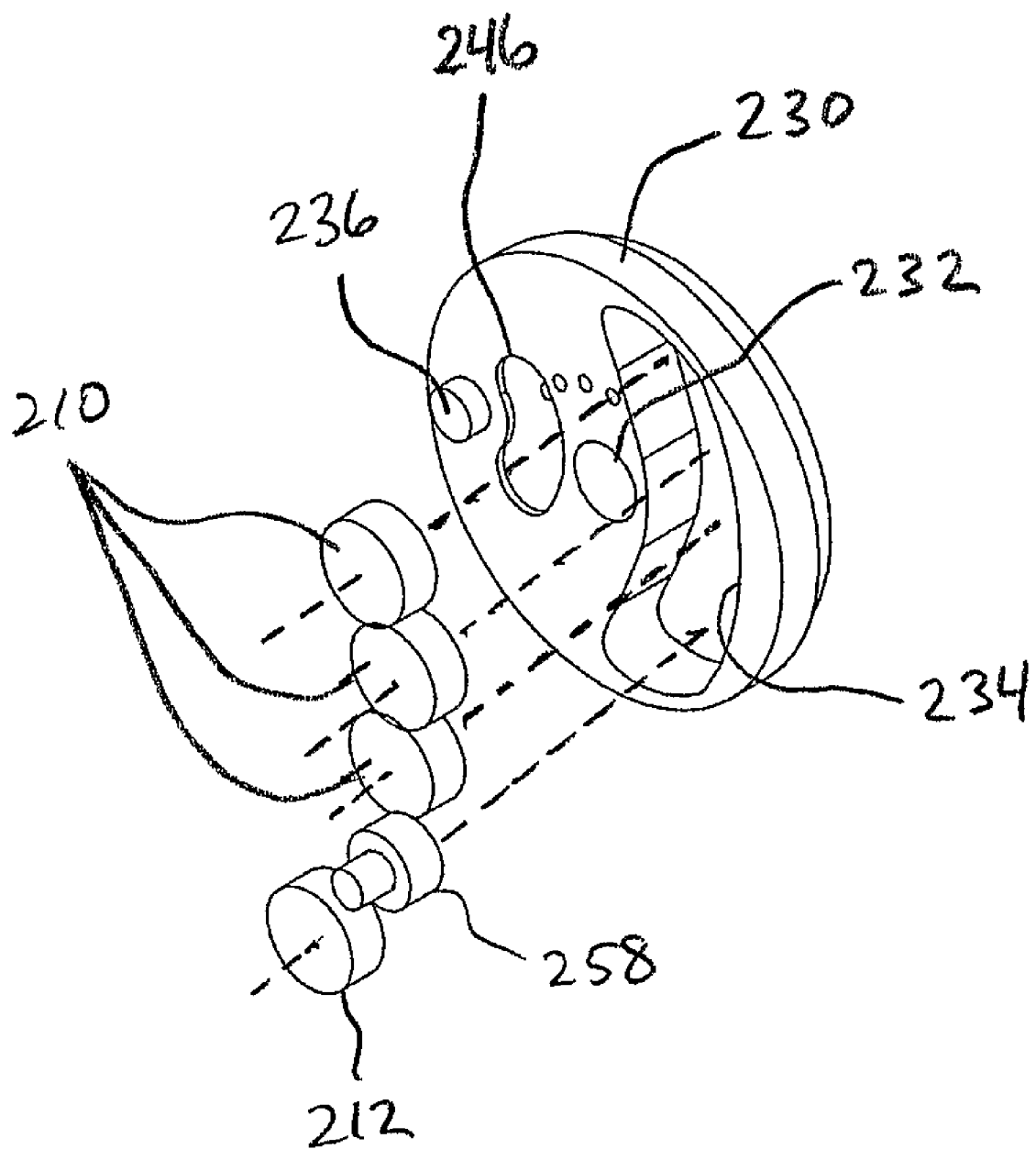
FIG. 4 is an enlarged in scale partial view of the embodiment of the invention shown in FIG. 3 taken from circle "FIG. 4"

Turning now to FIGS. 3 and 4, there is shown an alternative exemplary embodiment of the wheel shock absorbing apparatus of the present invention as an assembly 200 made up in part of one or more springing elements 210, here elastomeric discs, seated within a divided end cap 220 in such a manner that the springing action occurs when the parts of the divided end cap pivot relative to one another, one side of the pivot effectively acting against the axle 270, and the other side of the pivot effectively acting against the hub 280, with the seated springing element 210 limiting the pivot action in such manner as to control the velocity and extent of the travel allowed to the axle 270 through its arc of motion as delimited by its effective pivot relative to the hub about the pivot stud 236 of the outer end cap 230, more about which is said below. It will again be appreciated by those skilled in the art that by placing the springing element in the end cap 220 rather than within the space defined by the inside diameter of the hub, a larger cavity, a larger pivot radius and, hence, greater travel of the wheel with respect to the vehicle's frame is achieved. As such, it will be further appreciated that the increased performance and other advantages of this construction can be achieved in numerous other ways beyond those exemplary embodiments shown and described, which are for illustration only. A wide array of geometries and materials are possible without departing from the spirit and scope of the invention.

With reference now to FIG. 3, in more detail, the wheel shock absorbing assembly 200 is made up of the following major parts, depending on the particular embodiment: namely, the hub 280, the axle 270, two bearings 282, two inner end caps 250, a center tube 290 positioned axially between the two inner end caps, two outer end caps 230, a springing element 210 seated within each outer end cap, and two attachment devices which establish a fixed relationship between each end of the axle and the frame of the vehicle (not shown). Additional minor parts may include pins, screws, clips, bushings, and other small parts as necessary to hold the major parts in proper working relationship to each other. In the exemplary embodiment of FIG. 3, the inner end cap 250 is configured with a relatively flat inner surface 260, without the boss 152 of the first exemplary embodiment shown in FIGS. 1 and 2. Rather, a separate center tube 290 is configured to be assembled between the respective inner end caps 250 and to fit inside the inner ring of the bearings 282. A clearance hole 254 of virtually any configuration through which the axle 270 may move freely through its effective pivot arc is again provided in each inner end cap 250, and an analogous through hole 292 is provided in the center tube 290 so as to also allow for free movement of the axle through its arc relative to the hub 280. A pivot stud hole 256 is once again provided in the inner end cap 250 so as to receive the pivot stud 236 of the outer end cap 230, and an actuation stud 258 extends outwardly from the inner end cap 250, here in the form of a machine screw, to act against the springing element 210 in the outer end cap 230. As shown more clearly in FIG. 4, the outer end cap 230 is provided with an inwardly-protruding pivot stud 236 to fit into the pivot stud hole 256 in the inner end cap 250. In addition, a bushing 262 may be provided within the pivot stud hole 256 to facilitate movement, and a washer 264 may also be provided at the base of the pivot stud 236 to slightly space the bushing 262, and effectively the inner end cap 250, from the outer end cap 230. The outer end cap 230 is further provided with an axle mounting hole 232, as best shown in FIG. 4, for the axle 270 to pass through. With continued reference to FIG. 4, the outer end cap 230 may also be formed with one or more pockets 246 of various sizes and shapes primarily for the purpose of removing unneeded material, and thus weight, from the assembly. The outer end cap 230 also again includes a cavity 234 of particular shape and dimension to receive the springing elements 210, here taking more of an arcuate shape, and a multiplicity of threaded trajectory holes 238 that hold the trajectory screws 240 which control the angle at which the assembly 200 is related to the frame of the vehicle (not shown). Each trajectory screw 240 may also be configured with, or pass through, a trajectory sleeve 244 so as to provide a larger diameter or otherwise desirable contact profile for engaging the frame. In one embodiment, not shown, the trajectory sleeve 244 or the head of the trajectory screw 242 itself is formed with a transverse flat to further facilitate engagement with the vehicle frame. In a preferred embodiment, the springing elements 210 are a set of disc-shaped elastomers placed edge to edge, so as to contact along a line perpendicular to a tangent drawn at each disc's contact point, within the cavity 234 of the outer end cap 230 to receive the pivot force from the actuation stud 258 protruding from the inner end cap 250. Other embodiments may provide for a coiled spring or other types of springing elements, including, for example, a solid elastomer block, a hollow elastomer block, an elastomer block with voids, a solid elastomer disc, a hollow elastomer disc, an elastomer disc with voids, a solid elastomer cylinder, a hollow elastomer cylinder, an elastomer cylinder with voids, a solid elastomer wedge, a hollow elastomer wedge, and an elastomer wedge with voids. It will be appreciated that any combination of such springing elements, both in configuration and in number, may be employed in the present invention. Accordingly, and as shown in the other exemplary embodiments of the present invention discussed herein, the cavity 234 housing the springing elements 210, 212 may also take on a variety of configurations without departing from the spirit and scope of the present invention. The bearing 282 is a standard commercial item, sized to fit into the hub 280 and over the center tube 290 and with a large enough inside dimension to allow free movement of the axle 270 through its range of travel as provided by the pivot assembly. In a preferred embodiment, the axle 270 is a hollow tube of high strength material of the smallest diameter consonant with the required degree of strength and is provided with internal threads at each end to receive a bolt (not shown) which holds the axle in a fixed relationship to the frame of the vehicle (not shown), though it will be appreciated that axles of a variety of sizes and materials can be employed as best suiting a particular application. In most embodiments, the attachment point of the vehicle frame will be in the form of a slotted fork fitting the bolt attached to the axle 270 and the trajectory screws 240 and sleeves 244 which are fitted into the outer side 242 of the outer end cap 230. A negative springing element 212 may be provided within the cavity 234 of the outer end cap 230 opposite the main springing elements 210 to, again, limit and control the motion of the axle 270 as it returns from its extended position under force against the encapsulated springing elements 210. A further negative spring element like the tubular spring element 172 of the embodiment of FIGS. 1 and 2, though not shown, may again be fitted over the axle 270 where it passes through the hub 280 and center tube 290 so as to cooperate with the negative springing element 212 to further limit and control the motion of the axle as it returns from its extended position.

The assembly 200 provides for the axle 270 to effectively move through an arc within the hub 280 relative to a pivot point, essentially, the central axis of the pivot stud 236, the extent of the movement being dependent on the weight applied to the vehicle's frame and on the effect of irregularities in the travel surface as they act on the wheel. The axle 270 is attached rigidly to the frame of the implement or vehicle and flexibly to the hub of the wheel through a suspension system consisting of the parts named herein. Two divided end caps 220, one at each end of the axle 270, provide for suspension motion and the springing action of the assembly. The outer end cap 230 of each divided end cap 220 holds the axle 270 in the respective axle mounting holes 232, the negative spring 212 and the main spring elements 210. The inner end cap 250 of each divided end cap 220 holds a bearing 282 which supports the hub 280 and provides a clearance hole 254 of sufficient size and shape to allow the axle 270 to freely move through its arced path relative to the hub during use of the wheel shock absorbing apparatus 200 of the present invention. The inner end caps 250 may be fastened together at opposite ends of the center tube 290 using any method now known or later developed in the art, such as screws, bolts, welding, adhesives, snap or interference fits, and the like. In the embodiment shown, screws 266 pass through holes 268 in the inner end caps 250 and are then threadably inserted into axial threaded holes 294 in the end wall of the center tube 290. Collectively, in the exemplary embodiment of FIGS. 3 and 4, the pair of inner end caps 250 so assembled with the center tube 290 and also including the respective actuation studs 258 together define the inner body unit 205 of the assembly 200. The outer and inner end caps 230, 250 of each divided end cap 220 pivot relative to each other about the pivot stud 236 extending from the outer end cap 230 into a pivot stud hole 256 having a bushing 262 in the inner end cap 250 and so control the relative motion of the axle 270 and the hub 280. The suspension springing force is provided by an actuation stud 258 protruding from the inner end cap 250 of the divided end cap 220 into the cavity 234 so as to act against a springing element 210 seated within the outer end cap 230 of the divided end cap. It will be appreciated that the assembly as described above wherein the respective outer and inner end caps 230, 250 are brought into substantial parallel and abutting relationship, the springing elements 210 are so contained within the cavity 234 and are unable to shift to any real extent laterally, or along the axis of the assembly 200. In this exemplary embodiment, again, the center tube 290 fits tightly to the inside dimension of the bearings 282 and serves to support the hub 280 through the rotational motion provided by the bearings. The angle at which the assembly moves relative to the vehicle, and thereby the geometry of the suspension action, can be altered by positioning the trajectory screw 240 in the threaded holes 238 of the outer end cap 230. The negative springing elements 212 provide for a controlled return of the axle 270.

In operation, the hub 280 and inner parts of the divided end caps 220 move in response to weight applied to the vehicle or implement and to irregularities in the surface over which the wheel travels. Such movement is translated through the pivot action of the inner and outer end caps 230, 250 with respect to one another about the pivot stud 236, as explained above, into travel of the axle 270 through an effective arc relative to the hub 280 defined by the geometry of the pivot points and the axle holding points, or the location of the pivot stud 236 relative to the axle mounting hole 232, which define the effective radius of the arced path through which the axle moves during use. As the outer end cap 230 of the divided end cap 220 pivots relative to the inner end cap 250, the actuation stud 258 protruding from the inner end cap 250 compresses the springing elements 210 seated within the inwardly-opening cavity 234 of the outer end cap 230. Again, in a preferred embodiment, these springing elements 210 are a series of elastomer discs shaped and sized to fit within the cavity 234 in the outer end cap 230 of the divided end cap 220. The extent and speed of the movement are controlled and limited by the resilient force applied by the springing elements 210 against the pin 258. The diameter, thickness and hardness of the springing elements 210 and the ratio of the cavity 234 of the inner end cap determine the amount of damping applied to the movement of the axle 270. Regarding the actuation stud 258 itself, though it is shown and described as a machine screw installed in and extending from the outer end cap 230, it will be appreciated by those skilled in the art that any such protrusion now known or later developed in the art, including, for example, a bolt, a machined, press-fit, welded, adhered, or otherwise attached post or pin, or any other such device can be employed in the present invention to achieve mechanical engagement between the inner end cap 250 and the springing elements 210 of the outer end cap 230. Once more, it will be appreciated as well that a variety of modifications to the structure shown and described in the alternative exemplary embodiment of FIGS. 3 and 4 is possible without departing from the spirit and scope of the present invention.

Figure 5:
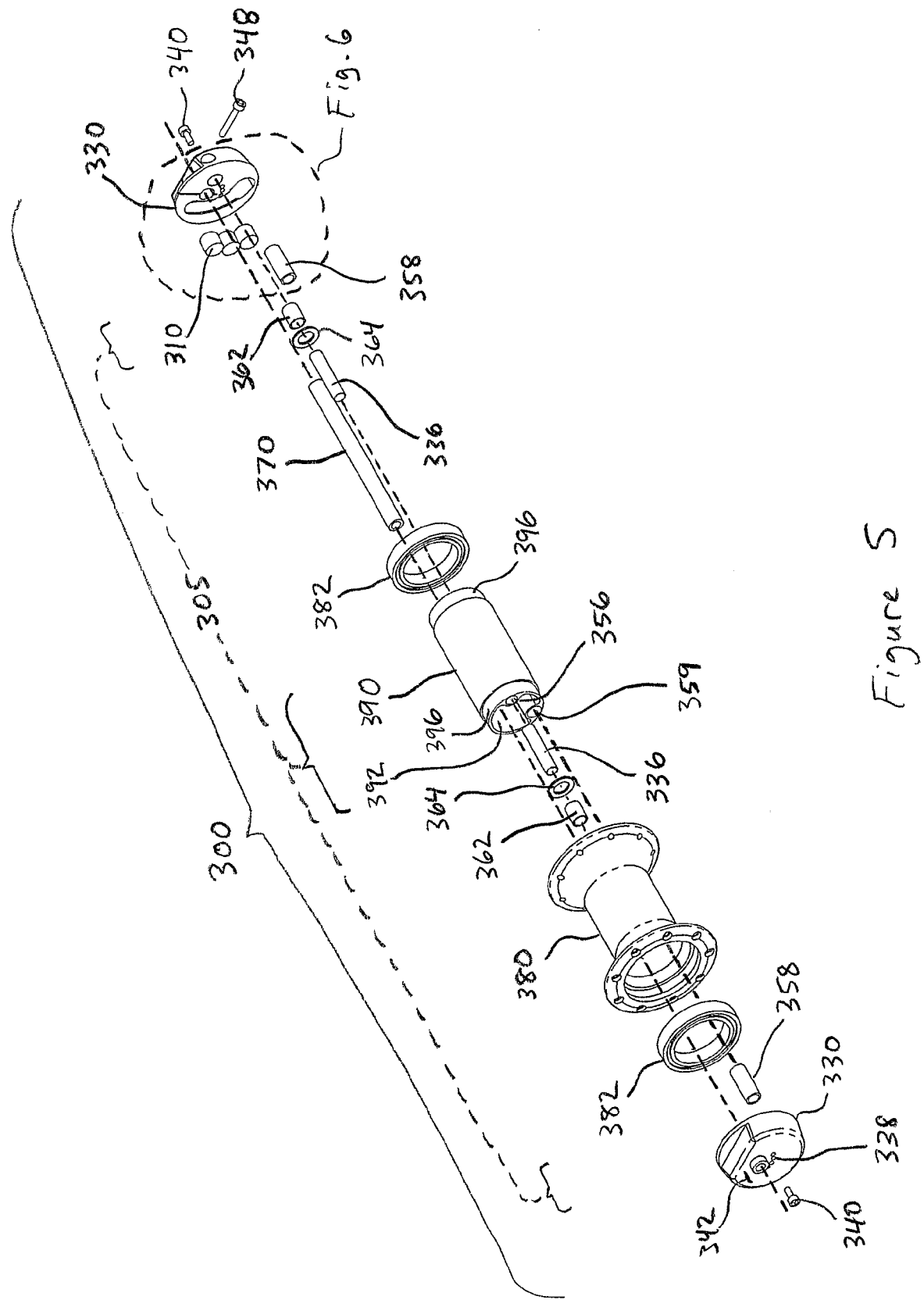
FIG. 5 is an exploded view of an alternative exemplary embodiment of the invention.
Figure 6:
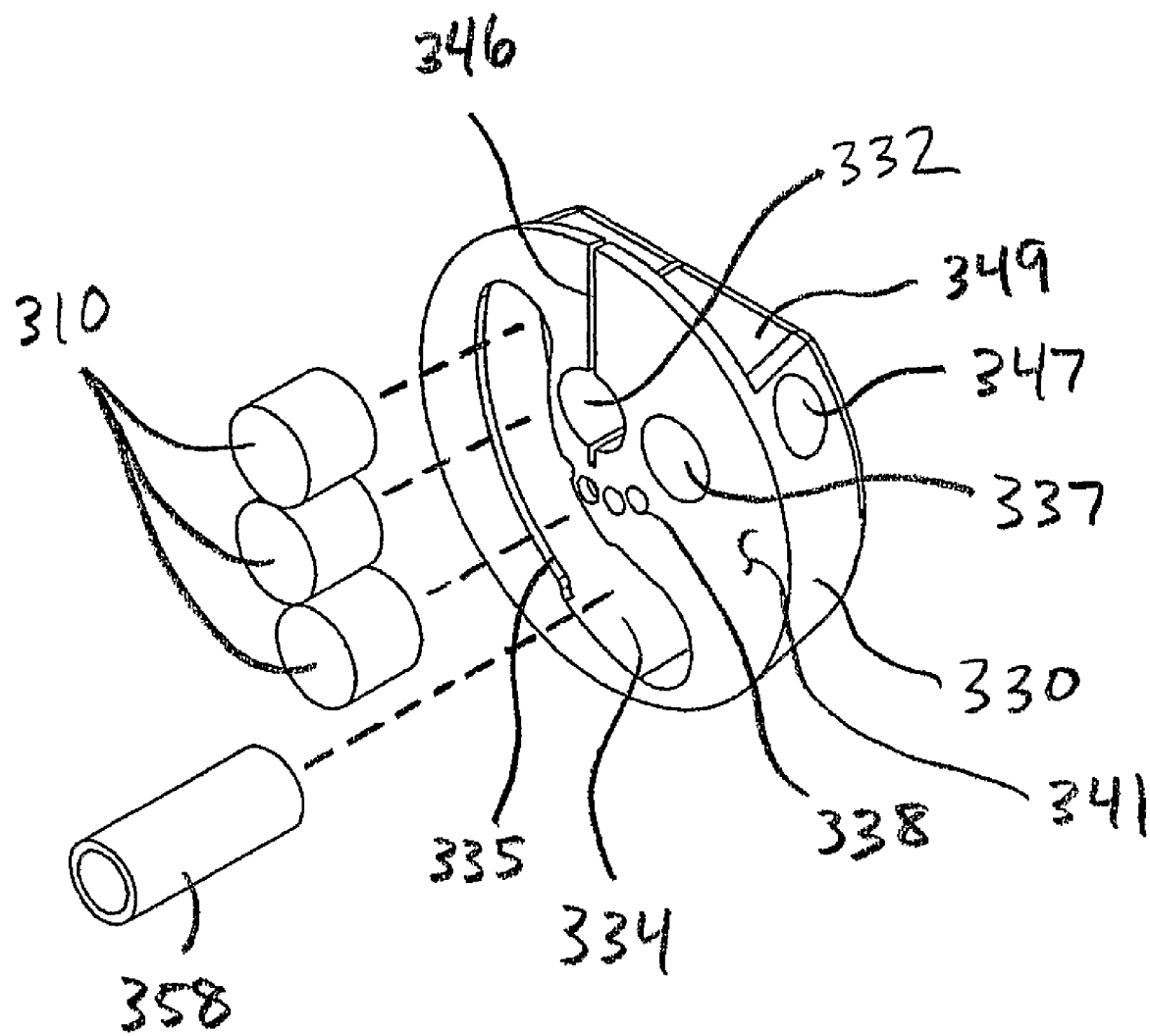
FIG. 6 is an enlarged in scale partial view of the embodiment of the invention shown in FIG. 5 taken from circle "FIG. 6"

Now turning to FIGS. 5 and 6, another exemplary embodiment of the wheel shock absorbing apparatus of the present invention is shown as an assembly 300 made up in part of one or more springing elements 310, here elastomeric discs, seated within an outer end cap 330 in such a manner that the springing action occurs when the end cap pivots relative to a center tube 390, one side of the pivot effectively acting against the axle 370, and the other side of the pivot effectively acting against the hub 380, with the seated springing elements 310 limiting the pivot action in such manner as to control the velocity and extent of the travel allowed to the axle 370 through its arc of motion relative to the hub as delimited by its effective pivot about the pivot stud 336 of the outer end cap 330, more about which is said below. It will be appreciated by those skilled in the art that by placing the springing elements in the outer end cap 330 rather than within the space defined by the inside diameter of the hub, a larger pivot radius and, hence, greater travel of the wheel with respect to the vehicle's frame is achieved. As such, it will be further appreciated that the increased performance and other advantages of this construction can be achieved in numerous other ways beyond those exemplary embodiments shown and described, which are for illustration only. A wide array of geometries and materials are possible without departing from the spirit and scope of the invention.

With reference now to FIG. 5, in more detail, the wheel shock absorbing assembly 300 is made up of the following major parts, depending on the particular embodiment: namely, the hub 380, the axle 370, two bearings 382, two outer end caps 330, a center tube 290 positioned axially between the two outer end caps, at least one springing element 310 seated within each outer end cap, and two attachment devices which establish a fixed relationship between each end of the axle and the frame of the vehicle (not shown). Additional minor parts may include pins, screws, clips, bushings, and other small parts as necessary to hold the major parts in proper working relationship to each other. In the exemplary embodiment of FIG. 5, there are no inner end caps 150, 250 as in the embodiments shown in FIGS. 1-4. Rather, a separate center tube 390 is configured to be assembled between the respective outer end caps 330 and to fit inside the inner ring of the bearings 382, preferably at opposite ends of the center tube where a turned down shoulder 396 is provided. A through hole 392 is provided in the center tube 390 of virtually any configuration through which the axle 370 may move freely through its pivot arc relative to the hub 380. An axial pivot stud hole 356 is provided in the opposite ends of the center tube 390 so as to receive the pivot stud 336 of the outer end cap 330, and an actuation stud 358 is installed in an actuation stud hole 359 also formed in the opposite ends of the center tube 390 offset from the respective pivot stud holes 356, here the actuation stud being formed as a post and again being configured to act against the springing element 310 in the outer end cap 330. As shown more clearly in FIG. 6, the outer end cap 330 is provided with an inwardly-opening pivot stud hole 337 so as to allow the pivot stud 336 to be installed between the center tube 290 and the outer end cap 330. In addition, a bushing 362 may be provided within either pivot stud hole 337, 356 to facilitate movement, and a washer 364 may also be provided about the pivot stud 336 to slightly space the center tube 390 from the outer end cap 330. In a preferred embodiment, the pivot stud 336 is rigidly mounted within the pivot stud hole 356 on the center tube 390 and so pivots within the pivot stud hole 337 of the respective outer end cap 330. The outer end cap 330 is further provided with an axle mounting hole 332, as best shown in FIG. 4, for the axle 370 to pass through.

Additionally, a transverse slit 346 may be formed in at least one of the outer end caps 330 so as to intersect the axle mounting hole 332 and the perimeter of the outer end cap, thereby allowing for the slight expansion and contraction of the axle mounting hole. Accordingly, a cross-hole 347 substantially perpendicular to the slit 346 may also be formed in the outer end cap into which a machine screw 348 (FIG. 5) may be threadably installed so as to selectively pull the slit closed and thus clamp the axle 370 within the axle mounting hole 332. More generally, in any of the embodiments of the present invention, one or both end cap may be fitted with one or more slits as a means of rigidly clamping either or both the pivot rod and the axle. Accordingly, one or more screws passing through the slits may be provided to clamp and hold the respective rods rigidly in position and in relation to each other. In one embodiment, a single slit is provided through one or both end cap, traversing the receptacle holes for both the axle and pivot rods so that a single screw may clamp both rods. In this embodiment, the relative sizes of the two holes in the end caps are made so that the relatively smaller hole is situated toward the end of the slit nearer to the solid part and the relatively larger hole is situated toward the open end of the slit, so that as the screw is tightened, which narrows the slit, the hole nearer the solid end clamps down first, and further tightening of the screw clamps down harder on the hole nearer the open end. In another embodiment, a slit 346 is only formed in one end cap 330 so as to intersect the axle mounting hole 332 and allow for clamping an end of the axle 370 within the respective end cap 330, while the opposite end cap is configured with no slit, but an appropriately sized axle mounting hole to allow for a press fit assembly of the axle. In this way, it will be appreciated that one end cap is removably attached to an end of the axle, while the other end cap is effectively permanently attached to the opposite end of the axle. Such a construction may cut material and labor costs while still allowing for both assembly and repair.

With continued reference to FIG. 6, the outer end cap 330 may also be formed with one or more flats 349 of various sizes and shapes for the purposes of providing a mounting surface for engaging the vehicle frame (not shown) during installation and, at the same time, removing unneeded material, and thus weight, from the assembly. The outer end cap 330 also 310, here again taking more of an arcuate shape, and a multiplicity of threaded trajectory holes 338 that hold the trajectory screws 340 which control the angle at which the assembly 300 is related to the frame of the vehicle (not shown). Each trajectory screw 340 may also be configured with, or pass through, a trajectory sleeve (not shown) so as to provide a larger diameter or otherwise desirable contact profile for engaging the frame. In a preferred embodiment, the springing elements 310 are a set of disc-shaped elastomers placed edge to edge, so as to contact along a line perpendicular to a tangent drawn at each disc's contact point, within the cavity 334 of the outer end cap 330 to receive the pivot force from the actuation stud 358 protruding from the center tube 390. Other embodiments may provide for a coiled spring or other types of springing elements, including, for example, a solid elastomer block, a hollow elastomer block, an elastomer block with voids, a solid elastomer disc, a hollow elastomer disc, an elastomer disc with voids, a solid elastomer cylinder, a hollow elastomer cylinder, an elastomer cylinder with voids, a solid elastomer wedge, a hollow elastomer wedge, and an elastomer wedge with voids. It will be appreciated that any combination of such springing elements, both in configuration and in number, may be employed in the present invention. Accordingly, and as shown in the other exemplary embodiments of the present invention discussed herein, the cavity 334 housing the springing elements 310 may also take on a variety of configurations without departing from the spirit and scope of the present invention. Moreover, referring again to FIG. 6, a radially inwardly-extending flange 335 may also be formed along the cavity 334 substantially at its interior edge, corresponding with the inside surface 341 of the outer end cap 330. In a preferred embodiment, the flange 335 extends along only a fraction of the entire length of the cavity 334 so as to effectively form a portion of the cavity having a relatively wider transverse opening and a portion of the cavity having a relatively narrower transverse opening. More specifically, in the preferred embodiment the mean diameter of the elastomeric discs 310 is less than the relatively wider transverse opening but greater than the relatively narrower transverse opening. Thus, it will be appreciated that the elastomeric discs 310 may be inserted into the cavity 334 through the relatively wider transverse opening and then shifted to that portion of the cavity corresponding to the location of the flange 335 forming a relatively narrower transverse opening, thereby retaining the discs 310 within the cavity. Accordingly, in this exemplary embodiment, it is also preferred that the free end of the actuation stud 358 be located in its at rest position within the cavity 334 substantially in the area of the relatively wider transverse opening so as to effectively trap the springing elements 310 within that portion of the cavity 334 corresponding to the location of the flange 335 and, hence, the relatively narrower transverse opening. It will be further appreciated that the diameter of the actuation stud 358 is less than the relatively narrower transverse opening of the cavity 334 so as to clear the flange 335 as the actuation stud shifts to compress the springing elements 310 during use of the wheel shock absorbing apparatus of the present invention as explained herein. The bearing 382 is a standard commercial item, sized to fit into the hub 380 and over the opposite shoulders 396 of the center tube 390 and with a large enough inside dimension to allow free movement of the axle 370 through its range of travel as provided by the pivot assembly. In a preferred embodiment, the axle 370 is a hollow tube of high strength material of the smallest diameter consonant with the required degree of strength and is provided with internal threads at each end to receive a bolt (not shown) which holds the axle in a fixed relationship to the frame of the vehicle (not shown), though it will be appreciated that axles of a variety of sizes and materials can be employed as best suiting a particular application. In most embodiments, the attachment point of the vehicle frame will be in the form of a slotted fork fitting the bolt attached to the axle 370 and the trajectory screws 340 which are fitted into the outer side 342 of the outer end cap 330. A negative springing element (not shown) of a variety of shapes may be provided within the cavity 334 of the outer end cap 330 opposite the main springing elements 310 to, again, limit and control the motion of the axle 370 as it returns from its extended position under force against the encapsulated springing elements 310. A further negative spring element like the tubular spring element 172 of the embodiment of FIGS. 1 and 2, though not shown, may again be fitted over the axle 370 where it passes through the hub 380 and center tube 390 so as to alone, or in cooperation with a negative springing element within the cavity 334, further limit and control the motion of the axle as it returns from its extended position.

The assembly 300 provides for the axle 370 to effectively move through an arc within the hub 380 relative to a pivot point, essentially, the central axis of the pivot stud 336, the extent of the movement being dependent on the weight applied to the vehicle's frame and on the effect of irregularities in the travel surface as they act on the wheel. The axle 370 is attached rigidly to the frame of the implement or vehicle and flexibly to the hub of the wheel through a suspension system consisting of the parts named herein. The two outer end caps 330, one at each end of the axle 370, provide for suspension motion and the springing action of the assembly, specifically, the outer end cap holding the axle 370 in a clamped fashion within the respective axle mounting holes 332 and housing the main spring elements 310 within its cavity 334. The center tube 390 holds one or more bearings 382 which support the hub 380 and provides a through hole 392 of sufficient size and shape to allow the axle 370 to freely move through its arced path relative to the hub during use of the wheel shock absorbing apparatus 300 of the present invention. In the exemplary embodiment of FIGS. 5 and 6, the center tube 390, including the respective actuation studs 358, defines the inner body unit 305 of the assembly 300. The outer end caps 330 pivot relative to the center tube 390 about the pivot stud 336 extending from a pivot stud hole 337 formed in the outer end cap 230 to a pivot stud hole 356 formed in each end wall of the center tube and so control the relative motion of the axle 370 and the hub 380. The suspension springing force is provided by an actuation stud 358 protruding from an actuation stud hole 359 also formed in each end of the center tube 390 into the cavity 334 of the respective outer end cap 330 so as to act against at least one springing element 310 seated within the outer end cap. In this exemplary embodiment, again, the center tube 390 fits tightly to the inside dimension of the bearings 382 and serves to support the hub 380 through the rotational motion provided by the bearings. The angle at which the assembly moves relative to the vehicle, and thereby the geometry of the suspension action, can be altered by positioning the trajectory screw 340 in the threaded holes 338 of the outer end cap 330.

In operation, the hub 380 and center tube 390 move in response to weight applied to the vehicle or implement and to irregularities in the surface over which the wheel travels. Such movement is translated through the pivot action of the center tube 390 with respect to the outer end caps 330 about the pivot stud 336, as explained above, into travel of the axle 370 through an arc within the hub 380 defined by the geometry of the pivot points and the axle holding points, or the location of the pivot stud 336 relative to the axle mounting hole 332, which define the effective radius of the arced path through which the axle moves during use. As the outer end cap 330 pivots relative to the center tube 390, the actuation stud 358 protruding from the center tube compresses the springing elements 310 seated within the inwardly-opening cavity 334 of the outer end cap. Again, in a preferred embodiment, these springing elements 310 are a series of elastomer discs shaped and sized to fit within the cavity 334 in the outer end cap 330. The extent and speed of the movement are controlled and limited by the resilient force applied by the springing elements 310 against the post 358. The diameter, thickness and hardness of the springing elements 310 and the ratio of the cavity 334 of the inner end cap determine the amount of damping applied to the movement of the axle 370. Regarding the actuation stud 358 itself, though it is shown and described as post installed in and extending from the opposite ends of the center tube 390, it will be appreciated by those skilled in the art that any such protrusion now known or later developed in the art, including, for example, a screw, a bolt, a machined, press-fit, welded, adhered, or otherwise attached pin, or any other such device can be employed in the present invention to achieve mechanical engagement between the center tube 390 and the springing elements 310 of the outer end cap 330. Once more, it will be appreciated as well that a variety of modifications to the structure shown and described in the alternative exemplary embodiment of FIGS. 5 and 6 is possible without departing from the spirit and scope of the present invention.

Figure 7:
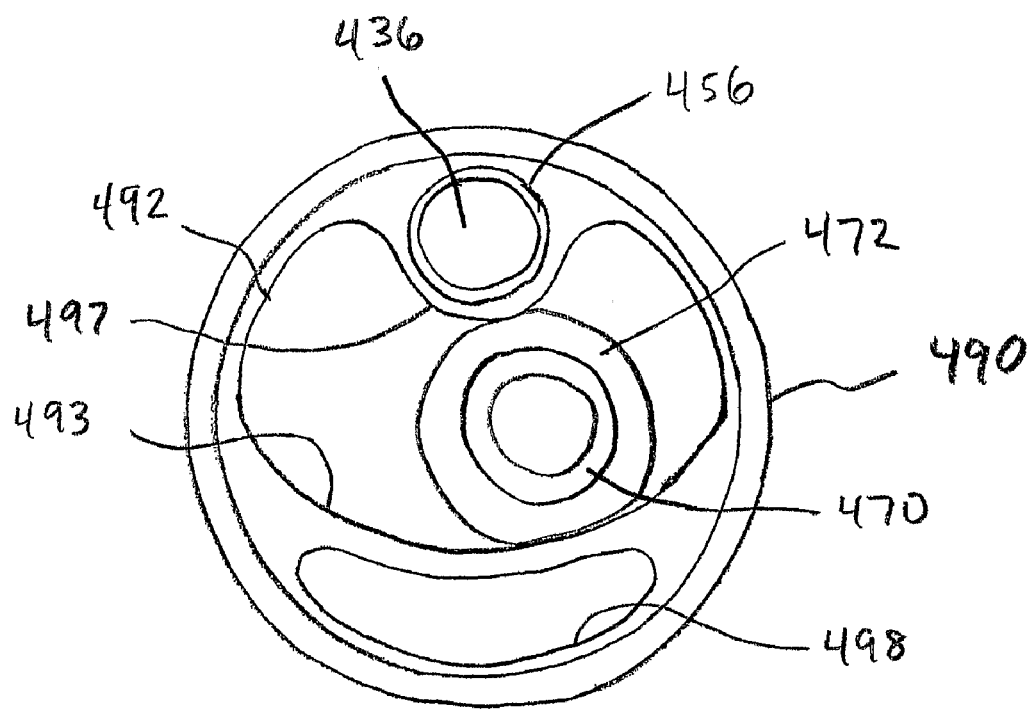
FIG. 7 is an end view of an exemplary component of the invention.
Figure 8:
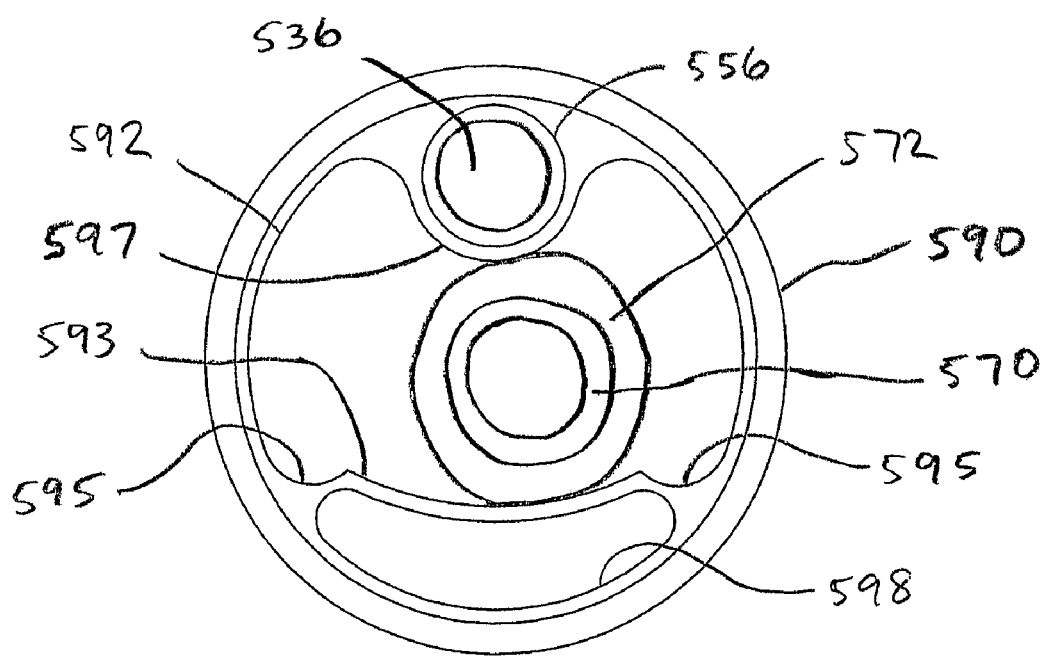
FIG. 8 is an end view of an alternative exemplary component of the invention.
Figure 9:
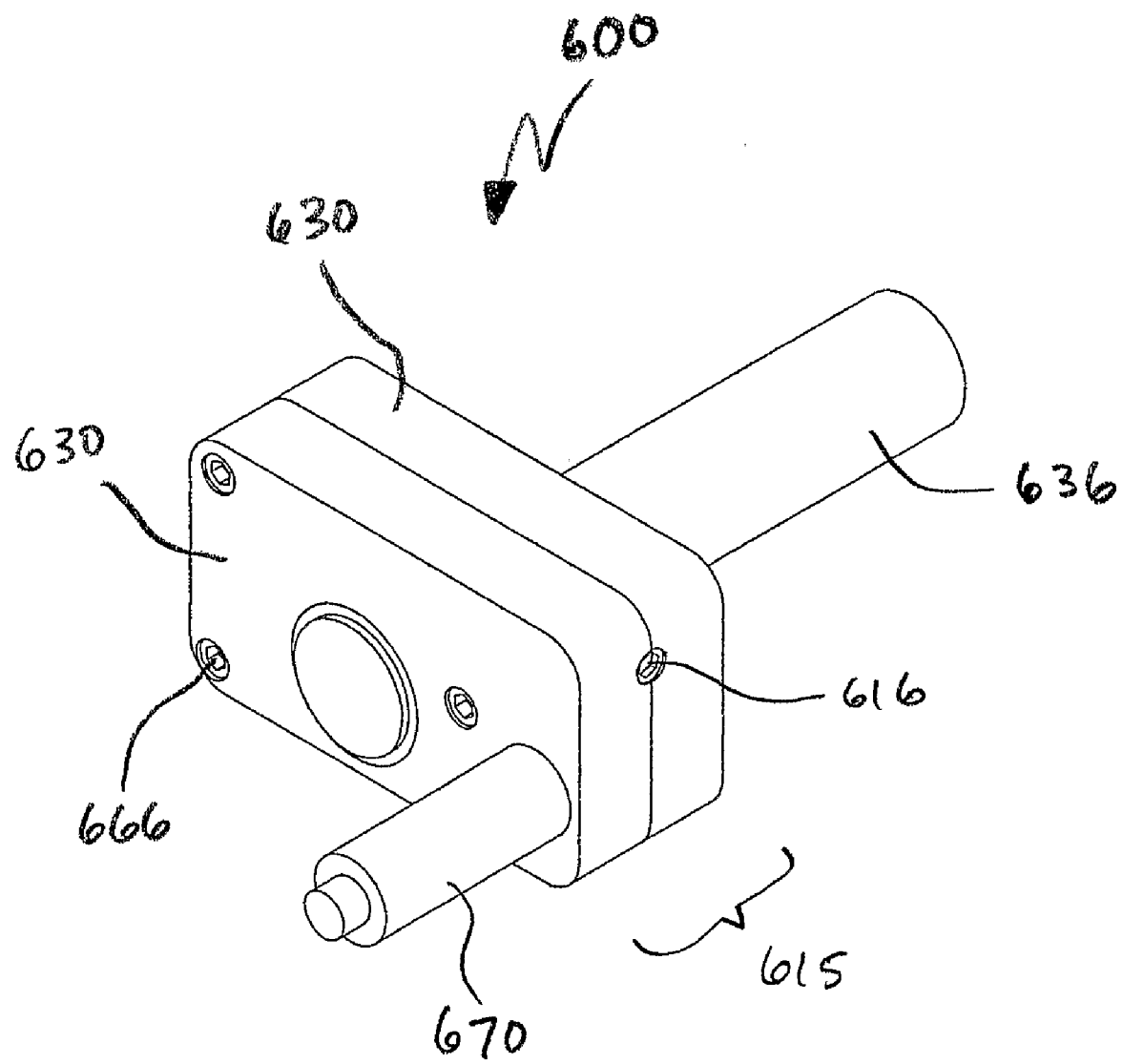
FIG. 9 is a perspective view of an alternative exemplary embodiment of the invention.

Referring now to FIGS. 7 and 8, there are shown end views of alternative center tubes that may be employed in various ones of the embodiments of the wheel shock absorbing apparatus of the present invention, which illustrate other advantageous aspects thereof. Exemplary embodiments of the wheel suspensions described herein may generally include, among other things, an axial center tube on which the bearings are seated so as to support rotation of the hub. In addition to the center tube, the system includes a hub, a pivot stud, an axle, an elastomer ring on the axle, and two outer end caps potentially housing one or more springing elements that are compressed as the center tube pivots about the pivot stud with respect to the outer end caps. Again, additional minor parts may include screws, clips, bushings, and other small parts as necessary to hold the major parts in proper relationship to each other. As discussed above, a tubular negative spring element, such as the tubular springing element 172 of FIG. 1, may be installed on the axle of the assembly so as to effectively dampen the movement of the axle as the center tube pivots about the pivot stud through its arcuate path relative to the outer end caps during use. Furthermore, one or more springs or elastomers may be fitted into the C-pocket through-hole of the center tube to provide shock absorption as is known in the art instead of or in addition to the novel shock absorption outside of the hub within the end caps. It will be appreciated by those skilled in the art that the center tubes shown and described are merely exemplary and numerous configurations of the profile are possible depending on the application, as evident from the other exemplary embodiments shown and described, without departing from the spirit and scope of the invention.

Turning to FIG. 7, specifically, in a further alternative embodiment of the center tube 490 itself, the through hole 492 is formed as a C-shaped pocket which contacts the axle tubular springing element 472 along at least one wall surface 493 and may further limit both the direction and amount of compression of any spring elements (not shown) positioned within the center tube through hole 492 itself. The center tube's C-shaped pocket, or through hole 492, is concentric to the pivot stud hole 456, and the installed pivot stud 436 itself, so as to provide space for the effective movement of the axle through an arc relative to the wheel hub, or center tube 490, and a wall surface 493 that is contacted by the outer surface of the tubular springing element 472. The radially inward wall surface 497 may also be contacted by the tubular springing element 472, so that the tubular springing element causes damping surface frictional contact with both opposite walls 493, 497 of the C-pocket through hole 492. Thus, in a preferred embodiment, the elastomer ring 472 fitted over the axle 470 is sized and configured so as to press against opposite sides of the C-pocket through hole 492 to provide an improved damping action to the movement of the axle 470 through its effective arc. The geometry of the C-shaped through hole 492 may also cooperate to retain in proper orientation a block of elastomer placed in the C-pocket center tube 490. One or more pockets 498 of various sizes and shapes primarily for the purpose of removing unneeded material, and thus weight, from the assembly may also be formed in the center tube 490.

Turning now to FIG. 8, there is shown a center tube 590 having an expanded C-shaped pocket, or through hole 592, concentric to the pivot stud hole 556, and pivot stud 536 itself, so as to again provide space for the movement of the axle 570 effectively through an arc relative to the center tube and for retention in proper orientation of one or more elastomers (not shown). Specifically, in this alternative embodiment, the C-pocket is "expanded" in that reliefs 595 are formed at substantially opposite lengthwise edges of the radially outward wall surface 593 of the pocket 592. An elastomer disc (not shown) may be fitted to one side of the axle 570 so as to provide a damping action at the rebound end of the movement of the axle through its effective arc, held in position, in part, by the respective reliefs 595. Again, one or more additional springing elements or elastomer blocks may be inserted within the center tube's through hole, with the shape and dimensions of the expanded C-pocket determining the amount of compression and deformation exerted on the elastomers by the movement of the axle 570. The expanded C-shaped pocket, or through hole 592, again provides opposite radially outer and inner wall surfaces 593, 597 that may both be contacted by the tubular springing element 572, so that the tubular springing element causes damping surface frictional contact with opposite sides of the C-pocket through hole 592. Thus, in a preferred embodiment, the elastomer ring 572 fitted over the axle 570 is sized and configured so as to press against opposite sides of the C-pocket through hole 592 to provide an improved damping action to the effective movement of the axle 570 through an arc relative to the center tube 590, and hence, the wheel hub. Again, it will be appreciated by those skilled in the art that this effect can be achieved by the tubular springing element containing either or both sides of the C-pocket through hole 592 and by a variety of shapes and configurations. The geometry of the through hole 592 may also cooperate to retain in proper orientation a block of elastomer placed in the C-pocket center tube 590.

With respect to the embodiments of both FIGS. 7 and 8, and center tubes employed in the wheel shock absorbing apparatus of the present invention, more generally, the center tube is preferably a tubular structure made of metal or other material of sufficient strength and formability. The outside of the center tube is preferably shaped as a shaft and passes through the full length of the hub, with provision for fitting bearings on one or both ends between the center tube and the hub. The inside of the center tube is preferably made with shaped pockets to hold the pivot stud, to provide for effective movement of the axle through an arc, and to provide open spaces for reduction of the weight of the overall assembly. Additional holes may be formed for installation of an actuation stud or for mounting one or more inner end caps to the center tube. An elastomer block of varying size, shape, density, and hardness may be provided within the center tube through hole for a desired amount of "springing" action in resistance to the movement of the axle through its effective arc relative to the center tube. The elastomer ring on the axle may be varied in length and thickness to provide for a desired amount of damping, or drag, against the sides of the C-pocket through hole. In operation, the hub and center tube move in response to weight applied to the wheel and to irregularities in the surface over which the wheel travels. Such movement is translated into effective travel of the axle through an arc by the geometry of the assembly. As the axle travels through its prescribed arc within the C-pocket through hole of the center tube, the extent and speed of its movement are controlled and limited by the resilient force applied by the elastomer parts effectively against the axle, whether located in the end caps, the center tube, or both. The amount of such resilience may be varied at will by selection of elastomer parts of differing size and shape and density. The shape and dimensions of the C-pocket determine the amount of compression and deformation exerted on the axle, and any enclosed elastomers, by the movement of the axle. The length and thickness of the elastomer ring fitted to the axle determines the amount of damping applied to the movement of the axle; that is, a "shock-absorber" type of reaction is achieved in the present invention whereby the speed of the return movement of the axle is controlled and limited for the sake of comfort and vehicle control.

Referring now to FIGS. 9-12, there is shown yet another alternative embodiment of the wheel shock absorbing apparatus of the present invention comprising an assembly 600 made up in part of a springing element 610, normally an elastomer or a coiled spring, seated within a module 615 comprised of two opposite ends, or outer end caps 630, having internal cavities 634 formed therein in such a manner that the springing action occurs when the module pivots around the shaft, or pivot stud 636, and paddle, or actuation stud 658, pressing the paddle 658 against the springing element 610, the shaft 636 being rigidly attached to the frame of the vehicle (not shown) and the axle 670 passing through the module causing the module to pivot around the shaft.

Figure 12:
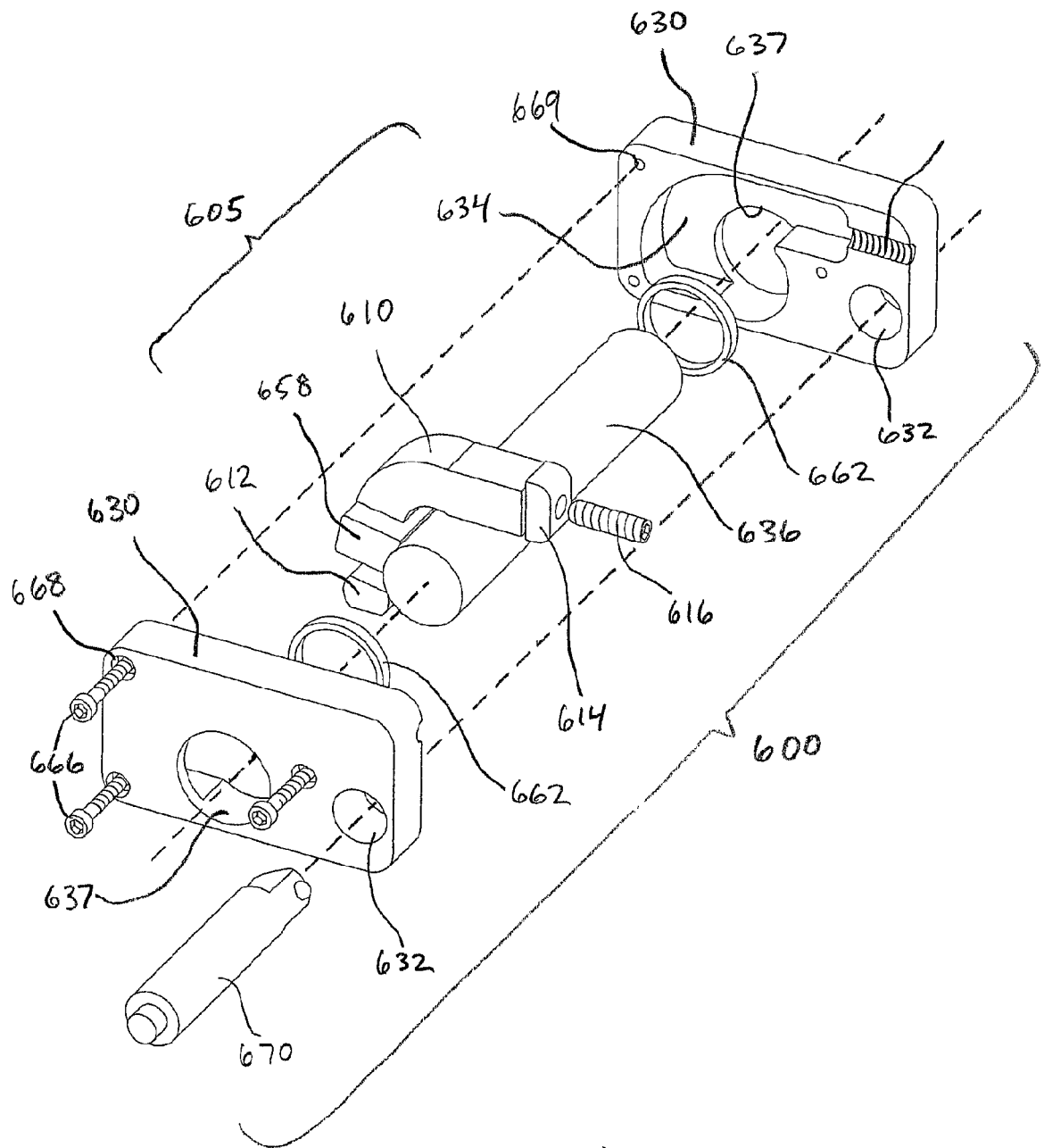
FIG. 12 is an exploded view of the embodiment of the invention shown in FIG. 9.

More specifically, turning to FIG. 12, This development of the suspension system is generally made up of the following components, more or less, depending on the particular embodiment: namely, the two halves, or outer end caps 630, of the module 615, the shaft 636, the paddle 658, bushings 662, the springing element 610, a spring adjustment block 614, and an adjustment screw 616. Other embodiments may omit the pressure block and adjustment screw or add a negative springing element 612. Additional minor parts may include pins, screws, and other small parts as necessary to hold the major parts in proper working relationship to each other. The two outer end caps 630 of the module 615 are formed with matching internal cavities 634 wherein the springing element 610 and related parts are contained. The opposite end caps 630 of the module 615 may be fastened together using any means now known or later developed in the art, including bolts, welding, adhesives, snap or interference fits, and the like, though machine screws 666 passing through a through hole 668 in one end cap and into a respective threaded hole 669 in the opposite end cap is shown. The module 615 is generally provided with two holes passing through from side to side: one for the shaft 636, which is rigidly connected to the frame of the vehicle (not shown), and one for the axle 670, which supports the wheel. Specifically, each outer end cap 630 is formed with a pivot stud bore 637 for passage therethrough of the shaft, or pivot stud 636, and with an offset axle mounting hole 632 for passage therethrough of the axle 670. Each pivot stud bore 637 may be further equipped with a bushing 662 to facilitate rotation of each outer and cap 630, or the module 615, about the pivot stud 636. A wheel and hub (not shown) may be rotatably installed on the axle as is known in the art. Furthermore, the axle 670 itself may be a tension "quick release" axle, a conventional bolted axle, or any other such axle now known or later developed. In one preferred embodiment, the springing element 610 is an elastomer shaped to fit in the cavity 634 formed within the matching halves of the module with room for deformation. Other embodiments may provide for a coiled spring or other types of springing elements as well.

An aspect of the present invention may be more generally described as an improved wheel suspension system 600 where the major suspension parts are arranged in such a manner that the axle 670 effectively moves in an arc around a shaft 636 with a rigidly attached paddle 658. The springing element 610 is seated in a cavity 634 formed within the module 615 defined by the respective outer end caps 630 in such manner that the paddle 658 acts progressively on the springing element as the axle moves through an arc. The shaft with paddle passes through the module and is rigidly attached to the frame of the vehicle. The dimensions and placement of the paddle control and restrain the lateral position of the module relative to the vehicle. Among the advantages to this development are light weight, compact sealed design, spring adjustability, and low cost of manufacturing. The suspension system may be applied to any implement or vehicle that requires suspension. In particular, this suspension system provides an efficient and light-weight means of absorbing vibration and minor irregularities in the travel surface.

Figure 11:
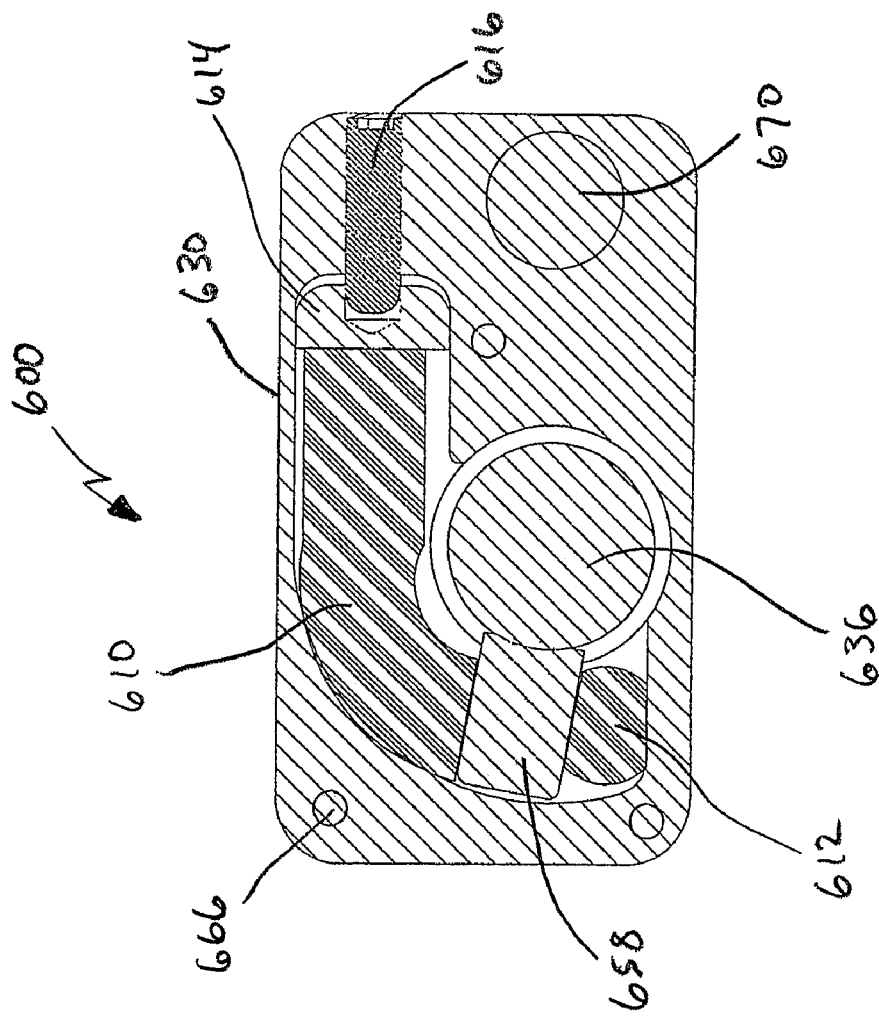
FIG. 11 is an enlarged in scale sectional view of the embodiment of the invention shown in FIG. 9 taken along line "A-A" of FIG. 10.
Figure 10:
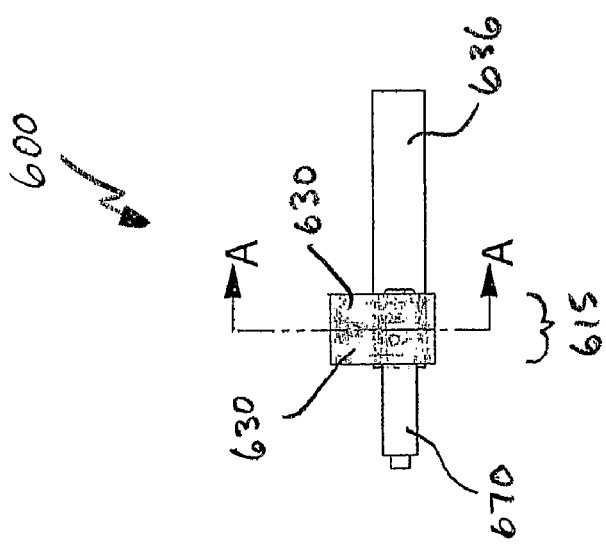
FIG. 10 is a reduced in scale side view of the embodiment of the invention shown in FIG. 9.

The assembly 600 provides for the axle 670 to effectively move through an arc relative to a shaft, or pivot stud 636, rigidly attached to the frame of the vehicle, the extent of the movement being dependent on the weight applied to the frame and on the effect of irregularities in the travel surface as they act on the wheel. The suspension springing force is provided by a springing element 610 within the cavity 634 of the module 615, again formed by the assembly of the two opposite end caps 630, pressing against a paddle, or actuation stud 658, attached to the pivot stud 636. On the rebound, it will be appreciated that forces can be dampened by providing a negative springing element 612 also within the cavity 634, but positioned between the cavity's far wall and the side of the paddle 658 opposite that contacted by the main springing element 610. Referring to FIG. 11, the actuation stud 658 is shown as a block mounted on the pivot stud 636 so as to extend substantially radially outwardly thereof. It will be appreciated by those skilled in the art that the actuation stud may be a screw or bolt, a machined, press-fit, welded, adhered, or otherwise attached post, or any other such device now known or later developed suitable for achieving mechanical engagement between the pivot stud 636 and the springing elements 610 trapped within the module 615, or the cavities 634 formed in the respective surfaces of the opposite outer end caps 630. In any event, in the present embodiment, the pivot stud 636 and the actuation stud 658 together define the inner body unit 605. As the module 615 rotates relative to the shaft 636, the actuation stud 658 progressively compresses the springing element 610. In one preferred embodiment, the resistance of the springing element 610 against such compression may be adjusted by means of a screw 616 altering the position of a pressure block 614 positioned adjacent the end of the springing element 610 opposite to the paddle 658.

In operation, the module 615 attached to the axle 670 moves through an arc in response to weight applied to the vehicle and to irregularities in the surface over which the vehicle travels. Such movement is translated through the pivot action of the module 615 into travel of the axle 670 through an arc delimited by the geometry of the module 615 and the degree of rotational travel allowed to the module by the shaft 636 and its attached paddle 658. Again, as the module 615 pivots relative to the shaft 636, the paddle 658 attached to the shaft 636 compresses the springing element 610. In a preferred embodiment this springing element is an elastomer shaped and sized to fit within the cavity 634 formed in the respective outer end caps 630 together forming the module 615. The extent and speed of the movement are controlled and limited by the resilient force applied by the elastomer 610 against the paddle 658. The amount of such resilience may be varied by the selection of elastomers of differing density and/or hardness. In some embodiments, the resilient force may also be adjusted by means of a pressure block 614, the position of which is controlled by a screw 616 passing through the end of the module 615 into the cavity 634. It will be appreciated that by tightening or loosening the adjustment screw 616, the pressure block 614 is shifted laterally within the cavity 634 so as to effectively decrease or increase the working length of the springing element 610. A negative springing element 612 positioned within the cavity 634 adjacent the paddle 658 opposite of the main springing element 610 can effectively provide for a controlled return of the axle 670 after it has been deflected through the rotation of the module 615 about the fixed shaft 636.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A wheel shock absorbing apparatus having a hub, a wheel installed on the hub, one or more bearings seated within the hub, and an axle running therethrough as is known in the art to together generally form a wheel assembly useful for achieving locomotion of a vehicle, wherein the improvement comprises:

at least two outer end caps having an inner surface and an outer surface, each outer end cap comprising an axle mounting hole and an axially inwardly-opening cavity radially offset from each axle mounting hole;

at least one springing element positioned within each cavity;

an inner body unit positioned substantially between the outer end caps and comprising at least one actuation stud oriented so as to project into each cavity and selectively contact the at least one springing element;

a means for pivoting the outer end caps relative to the inner body unit; and a means for fastening the outer end caps together such that the respective inner surfaces are opposite one another about the inner body unit and the at least one springing element is trapped within each respective cavity; and wherein:

the axle about which the hub and wheel rotate is installed in each axle mounting hole; and the pivoting means extends between the respective outer end caps and the inner body unit, whereby the outer end caps and the inner body unit pivot with respect to one another to cause the at least one actuation stud to contact the at least one springing element so as to absorb shocks as the wheel travels over a surface during locomotion of the vehicle.

2. The apparatus of claim 1 wherein:

the pivoting means is a pivot stud projecting axially inwardly from each outer end cap radially offset from each axle mounting hole and each cavity;

the inner body unit further comprises at least two inner end caps installed on opposite axial sides of the hub, each inner end cap comprising a clearance hole through which the axle passes and a pivot stud hole radially offset from the clearance hole and configured to receive the pivot stud so as to facilitate pivoting between the inner end caps and the respective outer end caps about the pivot stud; and the actuation stud projects axially outwardly from each inner end cap into each cavity formed in the respective outer end caps.

3. The apparatus of claim 2 wherein:
each inner end cap further comprises an axially inwardly-projecting boss positioned substantially about each clearance hole and a means for assembling the inner end caps together such that the clearance holes are substantially aligned and the respective bosses are rigidly connected substantially adjacent to one another so as to form the inner body unit; and
the bearings seated within the hub are mounted on the bosses so that the hub and the wheel rotate about the inner body unit, whereby rigidly mounting the outer end caps to the vehicle enables the wheel assembled to the inner body unit to deflect substantially vertically as the inner body unit pivots on the pivot studs relative to the respective outer end caps against the resistance of the at least one springing element within each cavity of the outer end caps engaged by each actuation stud formed on the respective inner end caps.

4. The apparatus of claim 2 wherein:
the inner body unit further comprises an axial center tube having an axial through hole through which the axle passes;
each inner end cap further comprises a means for assembling the inner end caps together about the center tube such that the respective clearance holes and the through hole are substantially aligned and the inner end caps are rigidly connected to the center tube so as to form the inner body unit; and
the bearings seated within the hub are mounted on the center tube so that the hub and the wheel rotate about the inner body unit, whereby rigidly mounting the outer end caps to the vehicle enables the wheel assembled to the inner body unit to deflect substantially vertically as the inner body unit pivots on the pivot studs relative to the respective outer end caps against the resistance of the at least one springing element within each cavity of the outer end caps engaged by actuation stud formed on the respective inner end caps.

5. The apparatus of claim 2 wherein each pivot stud hole is equipped with a bushing.

6. The apparatus of claim 1 wherein:
each outer end cap further comprises an end cap pivot stud hole radially offset from each axle mounting hole and each axially inwardly-opening cavity;
the pivoting means is two pivot studs configured to engage each end cap pivot stud hole;
the inner body unit further comprises an axial center tube installed substantially concentrically within the hub, the center tube comprising an axial through hole continuous between opposite ends of the center tube and through which the axle passes and a center tube pivot stud hole formed in each end of the center tube radially offset from the through hole and configured to receive each pivot stud so as to facilitate pivoting between the center tube and the respective outer end caps on the pivot studs;
each actuation stud projects axially outwardly from each end of the center tube into each cavity formed in the respective outer end caps; and
the bearings seated within the hub are mounted on the center tube so that the hub and the wheel rotate about the inner body unit, whereby rigidly mounting the outer end caps to the vehicle enables the wheel assembled to the inner body unit to deflect substantially vertically as the inner body unit pivots on the pivot studs relative to the respective outer end caps against the resistance of the at least one springing element within each cavity of the outer end caps engaged by each actuation stud formed on the respective ends of the center tube.

7. The apparatus of claim 6 wherein at least one pivot stud hole is equipped with a bushing.

8. The apparatus of claim 1 wherein:
the outer end caps further comprise two or more threaded trajectory holes positioned substantially along an arc about each axle mounting hole; and
a trajectory screw is removably fastened within a select one of the trajectory holes so as to extend substantially perpendicularly from the outer surface of each outer end cap and cooperate with a frame member of the vehicle to vary the angular deflection of the wheel with respect to the vehicle.

9. The apparatus of claim 1 further comprising a tubular springing element installed circumferentially about the axle so as to at least selectively contact the inner body unit.

10. The apparatus of claim 9 wherein:
the tubular springing element has a mean transverse diameter;
the inner body unit further comprises an axial through hole through which the axle passes, the through hole being configured with a substantially arcuate profile defining a mean transverse distance thereacross; and
the transverse diameter is substantially equivalent to the transverse distance so that frictional contact exists between the tubular springing element and the through hole.

11. The apparatus of claim 10 wherein:
the arcuate profile further defines laterally opposite reliefs; and
at least one elastomer is partially positioned within a select one of the reliefs of the through hole substantially between the axle and an interior wall of the through hole.

12. The apparatus of claim 1 wherein at least two springing elements are positioned within each cavity, the springing elements comprising:
a positive springing element engaged by the actuation stud upon movement of the wheel and hub vertically toward the vehicle; and
a negative springing element engaged by the actuation stud upon movement of the wheel and hub vertically away from the vehicle.

13. The apparatus of claim 1 wherein at least one of the outer end caps further comprises:
at least one slit passing through the axle mounting hole; and
a cross-hole substantially perpendicular to the slit for clamping a portion of the axle within the outer end cap.

14. The apparatus of claim 1 wherein:
each outer end cap further comprises a pivot stud bore radially offset from each axle mounting hole and adjacent to each cavity;
the pivoting means is a pivot stud mounted to the vehicle and passing through the respective pivot stud bores;
the actuation stud extends radially from the pivot stud, the actuation stud and the pivot stud together forming the inner body unit; and
the outer end caps so assembled form a module.

15. The apparatus of claim 14 further comprising:
an adjustment screw is threadably installed within the module so as to pass into each cavity; and
a pressure block is positioned within each cavity between the adjustment screw and the springing element, whereby the resilient force of the springing element is adjusted by selectively tightening or loosening the adjustment screw so as to shift the pressure block laterally within each cavity and effectively decrease or increase the working length of the springing element.

16. The apparatus of claim 15 wherein each pivot stud bore is equipped with a bushing.

17. A wheel shock absorbing apparatus having a hub, a wheel installed on the hub, one or more bearings seated within the hub, and an axle running therethrough as is known in the art to together generally form a wheel assembly useful for achieving locomotion of a vehicle, wherein the improvement comprises:

at least two outer end caps having an inner surface and an outer surface, each outer end cap comprising an axle mounting hole, a pivot stud projecting axially inwardly from each outer end cap radially offset from each axle mounting hole, and an axially inwardly-opening cavity radially offset from each axle mounting hole and each pivot stud;

at least one springing element positioned within each cavity;

at least two inner end caps installed on opposite axial sides of the hub, each inner end cap comprising a clearance hole through which the axle passes, a pivot stud hole radially offset from the clearance hole and configured to receive each pivot stud so as to facilitate pivoting between the inner end caps and the respective outer end caps about each pivot stud, and an actuation stud radially offset from each clearance hole and each pivot stud hole and oriented so as to project outwardly from each inner end cap into each cavity of the respective outer end caps and to selectively contact the at least one springing element, each inner end cap further comprising an axially inwardly-projecting boss positioned substantially about each clearance hole and a means for assembling the inner end caps together such that the clearance holes are substantially aligned and the respective bosses are positioned substantially adjacent to one another; and a means for fastening the outer end caps together such that the respective inner surfaces are opposite one another about the inner end caps and the at least one springing element is trapped within each respective cavity; and wherein:

the axle about which the hub and wheel rotate is installed in each axle mounting hole; and the bearings seated within the hub are mounted on the bosses so that the hub and the wheel rotate about the inner end caps, whereby rigidly mounting the outer end caps to the vehicle enables the wheel assembled to the inner end caps to deflect substantially vertically as the inner end caps pivot on the pivot studs relative to the respective outer end caps against the resistance of the one or more springing elements within each cavity of the outer end caps engaged by each actuation stud projecting from the respective inner end caps.

18. A wheel shock absorbing apparatus having a hub, a wheel installed on the hub, one or more bearings seated within the hub, and an axle running therethrough as is known in the art to together generally form a wheel assembly useful for achieving locomotion of a vehicle, wherein the improvement comprises:

at least two outer end caps having an inner surface and an outer surface, each outer end cap comprising an axle mounting hole, a pivot stud projecting axially inwardly from each outer end cap radially offset from each axle mounting hole, and an axially inwardly-opening cavity radially offset from each axle mounting hole and each pivot stud;

at least one springing element positioned within each cavity;

at least two inner end caps installed on opposite axial sides of the hub, each inner end cap comprising a clearance hole through which the axle passes, a pivot stud hole offset from the clearance hole and configured to receive the pivot stud so as to facilitate pivoting between the inner end caps and the respective outer end caps about the pivot stud, and an actuation stud radially offset from each clearance hole and each pivot stud hole and oriented so as to project axially outwardly from each inner end cap into each cavity of the respective outer end caps and to selectively contact the at least one springing element;

an axial center tube positioned between the respective inner and caps and having an axial through hole through which the axle passes;

a means for assembling the inner end caps together about the center tube such that the respective clearance holes and the through hole are substantially aligned and the inner end caps are rigidly connected to the center tube so as to form an inner body unit; and a means for fastening the outer end caps together such that the respective inner surfaces are opposite one another about the inner end caps and the at least one springing element is trapped within the respective cavity; and wherein:

the axle about which the hub and wheel rotate is installed in each axle mounting hole; and the bearings seated within the hub are mounted on the center tube so that the hub and the wheel rotate about the inner body unit, whereby rigidly mounting the outer end caps to the vehicle enables the wheel assembled to the inner body unit to deflect substantially vertically as the inner body unit pivots on the pivot studs relative to the respective outer end caps against the resistance of the one or more springing elements within each cavity of the outer end caps engaged by each actuation stud projecting from the respective inner end caps.

19. A wheel shock absorbing apparatus having a hub, a wheel installed on the hub, one or more bearings seated within the hub, and an axle running therethrough as is known in the art to together generally form a wheel assembly useful for achieving locomotion of a vehicle, wherein the improvement comprises:

at least two outer end caps having an inner surface and an outer surface, each outer end cap comprising an axle mounting hole, a pivot stud hole radially offset from the axle mounting hole, and an axially inwardly-opening cavity radially offset from each axle mounting hole and each pivot stud;

at least one springing element positioned within each cavity;

an axial center tube installed substantially concentrically within the hub, the center tube comprising an axial through hole continuous between opposite ends of the center tube and through which the axle passes and a pivot stud projecting axially outwardly from each end of the center tube radially offset from the through hole and configured to engage the respective pivot stud holes so as to facilitate pivoting between the center tube and the respective outer end caps about the pivot studs, the center tube further comprising an actuation stud radially offset from the through hole and the pivot stud hole and oriented so as to project axially outwardly from each end of the center tube into each cavity of the respective outer end caps and to selectively contact the at least one springing element; and a means for fastening the outer end caps together such that the respective inner surfaces are opposite one another about the center tube and the at least one springing element is trapped within each respective cavity; and wherein:

the axle about which the hub and wheel rotate is installed in each axle mounting hole; and the bearings seated within the hub are mounted on the center tube so that the hub and the wheel rotate about the center tube, whereby rigidly mounting the outer end caps to the vehicle enables the wheel assembled to the center tube to deflect substantially vertically as the center tube and the respective pivot studs pivot relative to the respective outer end caps against the resistance of the one or more springing elements within each cavity of the outer end caps engaged by each actuation stud formed on the respective ends of the center tube.

20. A wheel shock absorbing apparatus having a hub, a wheel installed on the hub, one or more bearings seated within the hub, and an axle running therethrough as is known in the art to together generally form a wheel assembly useful for achieving locomotion of a vehicle, wherein the improvement comprises:

at least two outer end caps having an inner surface and an outer surface, each outer end cap comprising an axle mounting hole, a pivot stud bore radially offset from each axle mounting hole, and an axially inwardly-opening cavity radially offset from each axle mounting hole and adjacent to each pivot stud bore;

at least one springing element positioned within each cavity;

a pivot stud mounted to the vehicle and passing through the respective pivot stud bores;

an actuation stud extending radially from the pivot stud and oriented so as to project axially into each cavity and selectively contact the at least one springing element;

a means for fastening the outer end caps together such that the respective inner surfaces are opposite one another and the at least one springing element is trapped within each respective cavity, the outer end caps so assembled forming a module;

an adjustment screw threadably installed within the module so as to pass into each cavity; and a pressure block positioned within each cavity between the adjustment screw and the springing element, whereby the resilient force of the springing element is adjusted by selectively tightening or loosening the adjustment screw so as to shift the pressure block laterally within each cavity and effectively decrease or increase the working length of the springing element; and wherein:

the axle about which the hub and wheel rotate is installed in each axle mounting hole; and the pivot stud is operative between the module and the pivot stud, whereby the module and the pivot stud pivot with respect to one another to cause the actuation stud to contact the at least one springing element so as to absorb shocks as the wheel travels over a surface during locomotion of the vehicle.

\* \* \* \* \*